(12) United States Patent
Tanaka

(10) Patent No.: US 8,171,133 B2
(45) Date of Patent: May 1, 2012

(54) MANAGEMENT APPARATUS AND MANAGEMENT METHOD FOR COMPUTER SYSTEM

(75) Inventor: Atsuhiro Tanaka, Minato-ku (JP)

(73) Assignee: NEC Corporation, Tokyo (JP)

( * ) Notice: Subject to any disclaimer, the term of this patent is extended or adjusted under 35 U.S.C. 154(b) by 32 days.

(21) Appl. No.: 12/373,254

(22) PCT Filed: Jul. 10, 2007

(86) PCT No.: PCT/JP2007/063735
§ 371 (c)(1),
(2), (4) Date: Jan. 9, 2009

(87) PCT Pub. No.: WO2008/007669
PCT Pub. Date: Jan. 17, 2008

(65) Prior Publication Data
US 2009/0287768 A1    Nov. 19, 2009

(30) Foreign Application Priority Data
Jul. 10, 2006    (JP) .................................. 2006-188999

(51) Int. Cl.
*G06F 15/173* (2006.01)
(52) U.S. Cl. ...................................... 709/224
(58) Field of Classification Search .................. 709/224;
705/52, 77
See application file for complete search history.

(56) References Cited

U.S. PATENT DOCUMENTS

| | | | |
|---|---|---|---|
| 2005/0107997 A1* | 5/2005 | Watts et al. ..................... 703/21 |
| 2006/0010101 A1* | 1/2006 | Suzuki et al. ..................... 707/2 |
| 2006/0048101 A1 | 3/2006 | Krassovsky et al. | |
| 2006/0218279 A1* | 9/2006 | Yamaguchi et al. .......... 709/226 |
| 2007/0276743 A1* | 11/2007 | Zalta et al. ..................... 705/34 |
| 2008/0005020 A1* | 1/2008 | Auvenshine et al. .......... 705/40 |
| 2008/0072232 A1* | 3/2008 | O'Toole, Jr. ................ 718/104 |

FOREIGN PATENT DOCUMENTS

| | | |
|---|---|---|
| JP | 6-95924 A | 4/1994 |
| JP | 2000-010828 A | 1/2000 |
| JP | 2000-207365 A | 7/2000 |
| JP | 2001-290641 A | 10/2001 |
| JP | 2001-344224 A | 12/2001 |

(Continued)

OTHER PUBLICATIONS

Shushi Kubo, "OS Review", 1988, pp. 174-179, Kyoritsu Shuppan Co., Ltd.

(Continued)

*Primary Examiner* — Christopher Biagini
(74) *Attorney, Agent, or Firm* — Sughrue Mion, PLLC

(57) ABSTRACT

A computer system according to the present invention is provided with a request classification tool generating a request classification log which describes a number of web requests handled by the computer system for each predetermined measurement period and for each type of the web requests; a system unification processing tool for generating a system log which describes a status of resources of the computer system for the each predetermined measurement period; and resource usage status analysis tool. The resource usage status analysis tool calculates a request handling resource usage amount per web request by using the request classification log and the system log for each type of the web requests, the request handling resource usage amount being a usage amount of resources used for handling the web requests per web request.

31 Claims, 9 Drawing Sheets

FOREIGN PATENT DOCUMENTS

| | | | |
|---|---|---|---|
| JP | 2002-342182 A | 11/2002 |
| JP | 2005-25372 A | 1/2005 |
| JP | 2005-31870 A | 2/2005 |
| JP | 2005-64971 A | 3/2005 |
| JP | 2005-148911 A | 6/2005 |
| JP | 2005-202894 A | 7/2005 |
| JP | 2005-216078 A | 8/2005 |
| JP | 2006-012065 A | 1/2006 |
| JP | 2006-24017 A | 1/2006 |
| JP | 2006-24107 A | 1/2006 |
| JP | 2006-155276 A | 6/2006 |
| WO | 2004/059501 A1 | 7/2004 |
| WO | 2006-046297 A1 | 4/2006 |

OTHER PUBLICATIONS

"From Two-Layered C/S to n-Layered Web System, from EUC to Information Community BtoB", Nikkei Open System, Jul. 2001, pp. 164-170, No. 100, Nikkei Business Publications. Inc.

"New Common Sense That Cannot Be Asked Any More" Nikkei Computer, Mar. 8, 2004, Nikkei Business Publications. Inc.

Ben Roly et al., "[Apache Handbook]," Nov. 25, 1997, pp. 41-57, Ohmsha Ltd.

* cited by examiner

| i | | CPU USAGE RATE (%) | USED MEMORY (MB) | OTHER RESOURCES |
|---|---|---|---|---|
| 1 | 10:00~10:05 | 30 | 80 | |
| 2 | 10:05~10:10 | 20 | 85 | |
| 3 | 10:10~10:15 | 25 | 70 | |
| ⋮ | ⋮ | ⋮ | ⋮ | |

Fig. 5

| i | | REQUEST R1 | REQUEST R2 | ... |
|---|---|---|---|---|
| 1 | 10:00~10:05 | 20 | 10 | ... |
| 2 | 10:05~10:10 | 10 | 15 | ... |
| 3 | 10:10~10:15 | 15 | 5 | ... |
| ⋮ | ⋮ | ⋮ | ⋮ | ⋮ |

31

Fig. 6A 

| | |
|---|---|
| CPU UNIT PRICE FOR WEB LAYER (YEN PER 5 MIN.) | |
| MEMORY UNIT PRICE FOR WEB LAYER (YEN PER 5 MIN.) | |
| CPU UNIT PRICE FOR FUNCTION LAYER (YEN PER 5 MIN.) | |
| MEMORY UNIT PRICE FOR FUNCTION LAYER (YEN PER 5 MIN.) | |
| CPU UNIT PRICE FOR DATA LAYER (YEN PER 5 MIN.) | |
| MEMORY UNIT PRICE FOR DATA LAYER (YEN PER 5 MIN.) | |

Fig. 6B 

| | |
|---|---|
| COMPUTER SYSTEM OPERATION COST FOR WEB LAYER (YEN PER 5 MIN.) | 1,000 |
| CPU CONTRIBUTION RATIO OF WEB LAYER (%) | 40 |
| MEMORY CONTRIBUTION RATIO OF WEB LAYER (%) | 60 |
| COMPUTER SYSTEM OPERATION COST FOR FUNCTION LAYER (YEN PER 5 MIN.) | 1,500 |
| CPU CONTRIBUTION RATIO OF FUNCTION LAYER (%) | 50 |
| MEMORY CONTRIBUTION RATIO OF FUNCTION LAYER (%) | 50 |
| COMPUTER SYSTEM OPERATION COST FOR DATA LAYER (YEN PER 5 MIN.) | 2,000 |
| CPU CONTRIBUTION RATIO OF DATA LAYER (%) | 60 |
| MEMORY CONTRIBUTION RATIO OF DATA LAYER (%) | 40 |

Fig. 7

| MEASUREMENT PERIOD "i" | REQUEST R1 | REQUEST R2 | ... |
|---|---|---|---|
| USER U1 | $N_{R1U1}(i)$ | $N_{R2U1}(i)$ | ... |
| USER U2 | $N_{R1U2}(i)$ | $N_{R2U2}(i)$ | ... |
| ⋮ | ⋮ | ⋮ | ⋮ |

| i | | REQUEST R1 | REQUEST R2 | ... |
|---|---|---|---|---|
| 1 | 10:00~10:05 | $N_{R1}(1) \cdot U_{R1}^W / \Delta t$ | $N_{R2}(1) \cdot U_{R2}^W / \Delta t$ | ... |
| 2 | 10:05~10:10 | $N_{R1}(2) \cdot U_{R1}^W / \Delta t$ | $N_{R2}(2) \cdot U_{R2}^W / \Delta t$ | ... |
| 3 | 10:10~10:15 | $N_{R1}(3) \cdot U_{R1}^W / \Delta t$ | $N_{R2}(3) \cdot U_{R2}^W / \Delta t$ | ... |
| ⋮ | ⋮ | ⋮ | ⋮ | ⋮ |

| i | | REQUEST R1 | REQUEST R2 | ... |
|---|---|---|---|---|
| 1 | 10:00~10:05 | $N_{R1}(1) \cdot M_{R1}^W$ | $N_{R2}(1) \cdot M_{R2}^W$ | ... |
| 2 | 10:05~10:10 | $N_{R1}(2) \cdot M_{R1}^W$ | $N_{R2}(2) \cdot M_{R2}^W$ | ... |
| 3 | 10:10~10:15 | $N_{R1}(3) \cdot M_{R1}^W$ | $N_{R2}(3) \cdot M_{R2}^W$ | ... |
| ⋮ | ⋮ | ⋮ | ⋮ | ⋮ |

MANAGEMENT APPARATUS AND MANAGEMENT METHOD FOR COMPUTER SYSTEM

TECHNICAL FIELD

The present invention relates to a managing apparatus for a computer system, and more particularly relates to a technique for extracting information useful for managing a computer system.

BACKGROUND ART

This application claims the benefit of the priority based on Japanese Patent Application (JP 2006-188999) filed on Jul. 10, 2006, and the disclosure of which is incorporated in the entirety into this specification by reference.

In order to properly operate a computer system, the usage amount and rate of resources of the computer system (for example, CPU (central processing unit) and a memory) are required to be managed. In a typical computer system, the usage amount and rate of resources used by respective running processes are monitored in real time. As such a technique, Japanese Laid Open Patent Application (JP-P 2005-25372A) discloses a technique for accurately estimating a CPU consumption time of each process. Japanese Laid Open Patent Application (JP-P 2005-216078A) discloses a technique which allows, when a certain transaction is executed which involves a plurality of processes, obtaining the CPU consumption amounts of all the processes related to the transaction and the profiles of the transmission data size and the reception data size only by specifying the process with which the transaction begins. Also, Japanese Laid Open Patent Application (JP-P 2005-64971A) discloses a technique for estimating the load distribution from the average load amount and the average source usage amount at each node.

One of the purposes of managing the usage amount and rate of the resources is to calculate billing data to charge the use fee of the computer system to the user. As described in a non-patent document entitled "OS Review", Shushi Kubo, KYORITSU SHUPPAN CO., LTD, 1988, pp. 174-179, the fee is typically calculated on the basis of the usage amount of the resources, specifically, the consumed CPU time, the usage amount of the main memory, the number of input/output operations, and the number of used print papers. Japanese Laid Open Patent Application (JP-A-Heisei 6-95924) discloses a technique for monitoring the CPU time to be charged when the CPU is used by the processes. Japanese Laid Open Patent Application (JP-P 2005-31870A) discloses a technique in which, even when a plurality of process groups are generated when a job is executed, the execution of the plurality of process groups is recognized as one job by the operation system for proper billing.

Another of the purposes for managing the usage amount and rate of the resources is to measure or estimate the loads and performances of the current and future computer system and to use the results in optimizing the scale and configuration of the computer system. For example, when the load of the computer system is estimated to be increased in future, resources are added to the computer system to thereby avoid the lack of the computer system performance. In one example, the computer system is sometimes provided with a plurality of hierarchical servers (for example, Japanese Laid Open Patent Application (JP-P 2001-290641A) employs the triple-layered configuration composed of web servers, application servers and data servers), and the management of the usage amount and rate of the resources allows properly judging the server layer to be increased. A computer system provided with the plurality of hierarchical servers is also disclosed in "From Two-Layered C/S To n-Layered Web System, From EUC To Information Community BtoB", Nikkei Open System, Nikkei Business Publications. Inc, no. 100, July 2001, pp. 164-170, and "New Common Sense That Cannot Be Asked Any More", Nikkei Computer, Nikkei Business Publications. Inc, Mar. 8, 2004. Also, Japanese Laid Open Patent Application (JP-P 2005-148911A) discloses a technique for balancing the load on the basis of the load information of each node.

For example, Japanese Laid Open Patent Application (JP-P 2006-24017A) discloses a system for analyzing the change in the usage state of the resources of the computer system and mechanically estimating the future tendency. In this known system, the CPU usage rate log and the transaction log are obtained from a Web application server and the CPU usage rate is estimated for each type of the transaction on the basis of the information of the CPU usage rate and the number of the processes of each transaction. The CPU usage rate for each type of the transactions is calculated by using a multiple regression analysis. The calculated CPU usage rate is used to determine the estimated process amount for each future certain time for each type of the transaction. Moreover, the CPU usage rate for each type of the transaction and the future estimation process amount are used to determine the configurations and settings of the software and hardware required to sufficiently satisfy the needs of the application in the server.

It should be noted here that the transaction in the Web application generally means a session involving multiple web requests (also referred to as HTTP requests) which satisfies the ACID property (the atomicity, the consistency, the isolation and the durability) (for example, refer to the paragraphs [0023] and [0024] in Japanese Laid Open Patent Application (JP-P 2000-207365A)). In order to execute a transaction, a session in which requests and replies are repeated many times is required (for example, refer to the paragraph [0005] in Japanese Laid Open Patent Application (JP-P 2001-344224A).

The HTTP (hyper text transfer protocol), which is used in the WWW, is generally considered not to be suitable for the transaction. This is because the HTTP is based on simple processing, that is, one-request-one-reply processing. In order to execute a transaction, a WWW server is required to execute various special processing. For example, Japanese Laid Open Patent Application (JP-P 2000-207365A) discloses a system for executing a transaction. In this system, when a request which requires a transaction scope (a set of individually independent requests which logically configure one transaction) is sent to a server by a client, the server creates transaction identification and maintains the identification during the durations of the plurality of independent web requests. The client sends a request requesting the transaction completion to the server by using the transaction identification and consequently sends a request for an additional action requiring the transaction scope to the server.

One of the issues to be considered in managing the use amount and rate of resources of a computer system that supports the standard HTTP is that a current Web application is allowed to handle a plurality of types of web requests in one process. A typical example is Apache, which is a typical software used as a Web server (See BEN ROLY, PETER ROLY, [Apache Handbook], Ohmsha Ltd. Nov. 25, 1997, pp. 41-57). The Apache employs an architecture in which one (or relatively few) process adapted to a plurality of types of web requests is permanently activated, and a plurality of requests asynchronously arriving at the process are scheduled in the process and executed. In such software, the CPU time consumed by a web request cannot be determined for each type of the web requests by measuring the CPU time consumed in each process. Many of currently used web servers and database servers carry out such operations. Under such situation, the calculation of the CPU time and the memory usage amount for each process is not sufficient for the management of the computer system.

To the inventor's knowledge, however, there is no known technique for managing resources of a computer system in accordance with the foregoing viewpoint. In particular, no technique is known at present which correctly manages resources within a computer system which supports a standard HTTP by managing the resources in terms of types of web requests. As described above, although the technique for calculating the CPU usage rate for each type of the transactions is known (Japanese Laid Open Patent Application (JP-P 2006-24017A)), it is not actually easy to realize the technique, since the HTTP is poor in affinity with handling the transaction.

DISCLOSURE OF INVENTION

It is therefore an object of the present invention to provide a technique for provide proper resource management through resource management in terms of types of web requests within a computer system handling a standard HTTP.

A computer system according to the present invention is a computer system which handles web requests received from clients. The computer system is provided with request classification log generating means for generating a request classification log which describes a number of web requests handled by said computer system in each measurement period for each type of said web requests; system log generating means for generating a system log which describes a status of resources of said computer system in said each measurement period; and resource usage status calculation means calculating a request handling resource usage amount per web request by using said request classification log and said system log for each type of said web requests, the request handling resource usage amount being a usage amount of resources used for handling said web requests per web request. Such computer system allows properly managing the resources through calculating the request handling resource usage amount per web request, which amount is a usage amount of resources used for handling the respective web requests.

The present invention is preferably applied to the computer system containing a plurality of layered servers. In this case, it is preferable that the system log generating means generates said system log for each layer of said plurality of servers and said resource usage status calculation means calculates said request handling resource usage amount for each layer of said plurality of servers.

Especially, when the computer system includes: web servers forming a web layer, an application server connected to said web server to form an application layer; and, a database server connected to said application to form a data layer, it is preferable that said system log generating means generates said system log for each of said web layer, said application layer and said data layer, and said resource usage status calculation means calculates said request handling resource usage amount for each of said web layer, said application layer and said data layer.

When the computer system further includes: a load balancer receiving said web request from said clients and distributing said web requests to said web servers, it is preferable that said load balancer generates a request log describing clock times when said web requests were handled and types of said web requests for each of said web requests received by said computer systems, and said request classification log generating means generates said request classification log from said request log.

Preferably, the computer system further includes billing data generating means for generating billing data indicative of a use fee to be charged to a user by using said request handling resource usage amount.

In this case, it is preferable that said resource usage status calculation means calculates a default resource usage amount which is a usage amount of resources used independently of said web requests, and said billing data generating means calculates a virtual resource usage amount for each type of said web requests by distributing said default resource usage amount in accordance to the ratios of usage amounts of respective types of said web requests, and calculates said use fee from said request handling resource usage amount and said virtual resource usage amount. In this case, it is preferable that said resource usage status calculation means calculates said default resource usage amount through performing multiple linear regression analysis on a number of web requests of each type of said web requests in said each measurement period described in said request classification log and a usage status of resources of said computer system described in said system log for said each measurement period.

It is also preferable that the computer system further includes user data generating means which generates, from a request log which describes for each web request received by said computer system a user ID of a user who issues said each web request and a type of said each web request, user data describing a number of said web requests issued by said user for each type of said web requests, and said billing data generating means calculates a unit price which is a fee charged to said web requests per web request from said virtual resource usage amount and calculates said use fee from said unit price and said user data.

Preferably, the computer system further includes system management data generating means for calculating a usage status of said resources for each type of the web requests in said each measurement period from said request handling resource usage amount, and displaying the calculated usage status of said resources on a graph. In this case, it is preferable that said system management data generating means has a function of displaying on said graph the usage status of said resources for each type of the web requests in said each measurement period. It is also preferable that said system management data generating means has a function of displaying on said graph a usage rate of each of said resources in one or more measurement period for each type of said web requests. Furthermore, it is preferable that the system management means has a function of, when displaying the usage rates of said respective resources in multiple measurement periods for each type of said web requests, calculating the average value of the usage rates in the respective measurement periods.

When said system log describes a usage status of CPUs of said computer system for said each measurement period, and said resource usage status calculating means calculates CPU times for said each measurement period and per web request, during which said CPUs are used in each of layers of said plurality of servers for handling said web requests, it is preferable that the computer system further includes said system management data generating means calculates a response time to said web requests for each type of said web requests through summing up said CPU times of the respective layers of said plurality of servers.

A management apparatus according to the present invention is a management apparatus which manages a computer system which handles web requests received from clients. The management apparatus is provided with request classification log generating means (21) for generating a request classification log which describes a number of web requests handled by said computer system in each measurement period for each type of said web requests; system log generating means for generating a system log which describes a status of resources of said computer system in said each measurement period; and resource usage status calculation means for calculating a request handling resource usage amount per web request by using said request classification log and said system log for each type of said web requests, the request handling resource usage amount being a usage amount of resources used for handling said web requests. Such management apparatus allows properly managing the resources through calculating the request handling resource usage amount per web request, which amount is a usage amount of resources used for handling the respective web requests.

A management method for managing a computer system handling web requests received from clients is provided with a step of generating a request classification log which describes a number of web requests handled by said computer system in each measurement period for each type of said web requests; a step of generating a system log which describes a status of resources of said computer system in said each measurement period; and a step of calculating a request handling resource usage amount per web request by using said request classification log and said system log for each type of said web requests, the request handling resource usage amount being a usage amount of resources used for handling said web requests. Such management method allows properly managing the resources through calculating the request handling resource usage amount per web request, which amount is a usage amount of resources used for handling the respective web requests.

A computer program according to the present invention is a computer program for managing a computer system which handles web requests received from clients. The computer program allows a computer to execute: a step of generating a request classification log which describes a number of web requests handled by said computer system in each measurement period for each type of said web requests; a step of generating a system log which describes a status of resources of said computer system in said each measurement period; and a step of calculating a request handling resource usage amount per web request by using said request classification log and said system log for each type of said web requests, the request handling resource usage amount being a usage amount of resources used for handling said respective web requests. Such computer program allows properly managing the resources through calculating the request handling resource usage amount per web request, which amount is a usage amount of resources used for handling the respective web requests.

The present invention allows calculating the resource usage amount of the web requests for each type of the web requests and properly managing the computer system in accordance with the calculated resource usage amount.

BRIEF DESCRIPTION OF DRAWINGS

FIG. 3 is a table showing contents of a system log;

FIG. 5 is a view showing contents of a request classification log;

FIG. 6A is a table showing an example of contents of a unit price table;

FIG. 6B is a table showing another example of contents of a unit price table;

FIG. 7 is a view showing contents of user data;

FIG. 8A is a table showing contents of a CPU output table;

FIG. 8B is a view showing contents of a memory output table;

BEST MODE FOR CARRYING OUT THE INVENTION

Figure 1:
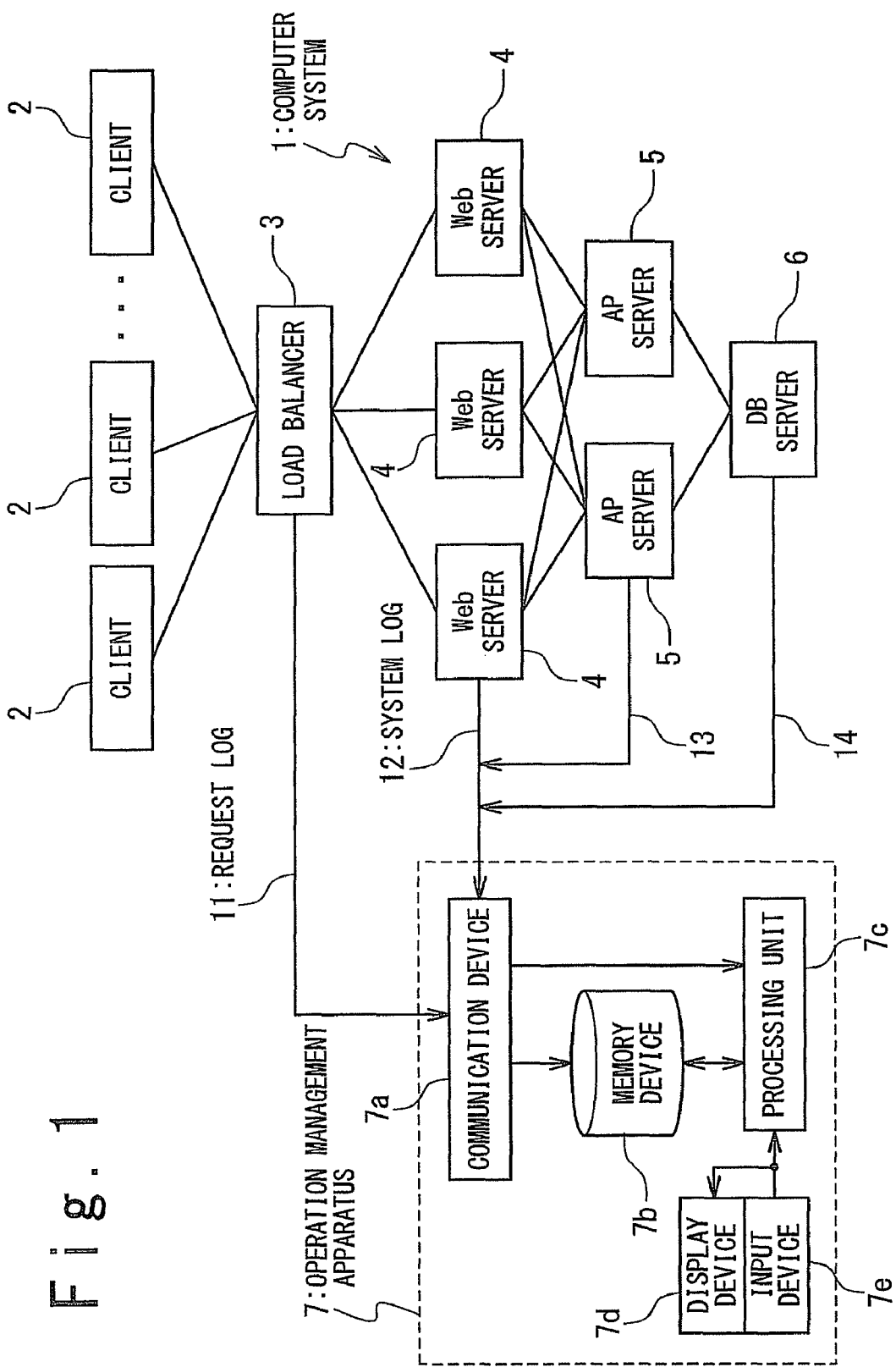
FIG. 1 is a block diagram showing the configuration of a computer system in one exemplary embodiment of the present invention.

FIG. 1 is the block diagram showing the configuration of a computer system 1 in one exemplary embodiment of the present invention. The computer system 1 in this exemplary embodiment receives web requests from clients 2 and handles the received web requests. The term "web request" in this specification means a message defined in the HTTP, which is usually used to refer to a file prepared on the computer system 1 or to start a CGI (common gateway interface). In this exemplary embodiment, web requests are classified into various types in accordance with the method described therein. web requests may include, for example, a GET request including a GET method, a PUT request including a PUT method, a POST request including a POST method, and a DELETE request including a DELETE method and so on. As described later, a management based on types of web requests is implemented in the computer system 1 of this exemplary embodiment.

The computer system 1 of this exemplary embodiment employs a triple-layer structure. Specifically, the computer system 1 contains a load balancer 3, Web servers 4 configuring a web layer (presentation layer), application servers (AP servers) 5 configuring a function layer, and a database server (DB server) 6 configuring a data layer. In this exemplary embodiment, multiple Web servers 4 and AP server 5 are provided, while only one database server 6 is provided. The number of the servers in each layer may be arbitrary changed.

The load balancer 3 receives web requests transmitted from the clients 2, and distributes the web requests to the Web servers 4 by using a proper load balancing algorism. The Web servers 4 receive the transmitted web requests and handle the web requests by using functions of the AP servers. In using the functions of an AP server 5, a Web server 4 creates an AP request to instruct an AP server 5 to execute desired processing. The AP servers 5 execute task logics in response to AP requests transmitted from the Web servers 4, and returns the processing results to the Web servers 4 under a format used in the WWW (for example, the HTML format and the XML format). If necessary, the AP servers 5 access the database server 6. The database server 6 contains a database and retrieves and updates the database, in accordance with the request transmitted from the AP servers 5.

In order to manage the computer system 1, an operation management apparatus 7 is prepared in the computer system 1. As the operation management apparatus 7, a computer apparatus is used which contains a communication device 7a, a memory device 7b, a processing unit 7c, a display device 7d and an input device 7e. The various software programs for managing the computer system 1 are installed onto the operation management apparatus 7. Various logs, specifically, a request log 11 transmitted from the load balancer 3 and system logs transmitted from the respective Web servers 4, the AP servers 5 and the database server 6, are used to manage the computer system 1. The system logs transmitted from the Web servers 4 are denoted by the numeral 12, the system logs transmitted from the AP servers 5 are denoted by the numeral 13, and the system log transmitted from the database server 6 is denoted by the numeral 14.

Figure 2:
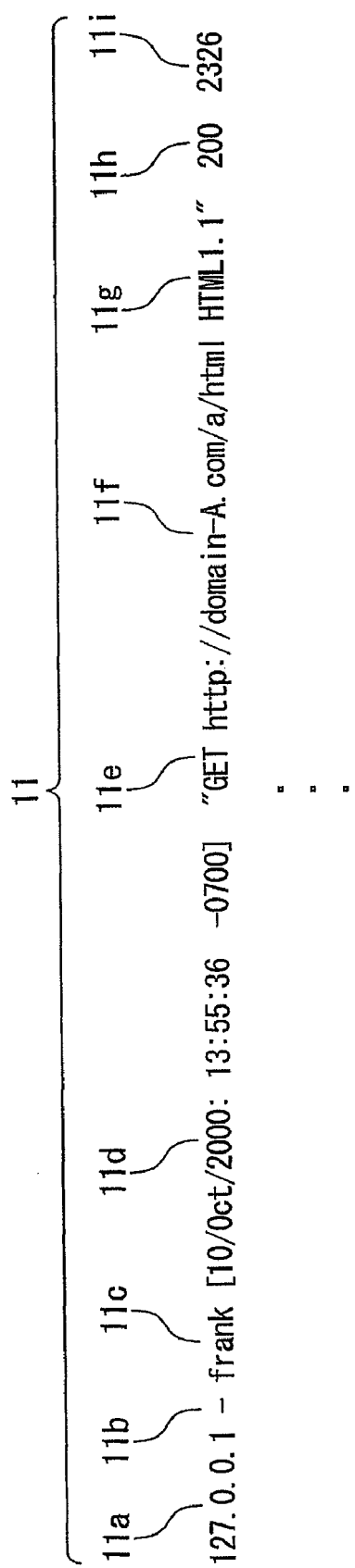
FIG. 2 is a view showing contents of a request log.

The request log 11 is a record with regard to web requests arriving at the computer system 1, which describe the times when web requests are handled and the types of the web requests. FIG. 2 is a view showing the contents of the request log 11 in this exemplary embodiment. FIG. 2 shows only the portion corresponding to one web request in the request log 11.

In this exemplary embodiment, the request log 11 describes the following data. First, the request log 11 describes IP addresses 11a of the clients 2 issuing the web requests, identities 11b of the clients 2 (defined under RFC1413), and user IDs 11c of the clients 2 issuing the web requests. Although the identity 11b is described as "-" (hyphen) in the request log 11 shown in FIG. 2, this indicates that the information of the identity 11b of the client 2 has not been able to be obtained. The user ID 11c is given to the user who is successfully authenticated in the HTTP authentication. If the authentication is failed, the user ID 11c is noted as "-" (hyphen).

Moreover, the request log 11 describes the clock times 11d when the web requests are handled, the types 11e of the web requests (namely, the methods described in the web requests), the URLs (uniform resource locator) 11f of documents referred to by the web requests, and the version numbers 11g of the used HTTP protocol. The clock times 11d when the web requests are handled may be defined as the times when the handlings of the web requests are completed or may be defined as the clock times when the web requests arrive. In the example of FIG. 2, the type of the web request is the GET request, and the version number of the used HTTP protocol is 1.1.

In addition, the request log 11 describes the status codes 11h indicating whether or not the web requests are successfully handled and the byte numbers 11i (except the headers) of the data returned to the clients 2 as the processing results of the web requests.

In this exemplary embodiment, the request log 11 transmitted from the load balancer 3 is used to manage the computer system 1. The request logs sent by the respective Web servers 4 may be used instead.

On the other hand, system logs 12, 13 and 14 are records which describe the usage statuses of the resources in the Web servers 4, the application servers 5 and the database server 6 for each measurement period. In one exemplary embodiment, each measurement period is defined as a constant time interval (for example, 5 minutes). It should be noted that the length of the measurement period may be variable. FIG. 3 is a table showing the contents of the system logs 12. In this exemplary embodiment, the system logs 12 describe the CPU usage rates and memory usage amounts of the corresponding Web servers 4 at intervals of 5 minutes. That is, the system logs 12 describe the CPU usage rates and memory use amounts of the corresponding Web servers 4 for each measurement period having a length of 5 minutes. The system logs 13 and 14 also have the same contents. The system logs 13 describes the CPU usage rates and memory use amounts of the corresponding AP servers 5 at intervals of 5 minutes, and the system log 14 describes the CPU usage rate and memory use amount of the DB server 6 at intervals of 5 minutes.

The function of generating system logs of such contents is usually contained in typical operating systems such as Windows (the registered trademark of Microsoft Corporation) or UNIX (the registered trade mark of the Open Group). The use of the function of the operating system eliminates the necessity of preparing a special mechanism to generate system logs for the operating system, the Web server 4, the AP server 5 and the DB server 6, effectively reducing the implementation cost.

The operation management apparatus 7 manages the computer system 1, using the request log 11 and the system logs 12, 13 and 14. The operation management apparatus 7 in this exemplary embodiment has two features. The first feature of the operation management apparatus 7 of this exemplary embodiment is that the operation management apparatus 7 calculates the resource usage amount consumed to handle the web requests for each type of the web requests, and the calculated resource usage amount is used to manage the computer system 1. The second feature of the operation management apparatus 7 of this exemplary embodiment is that the resource usage amount consumed to handle the web requests can be calculated for each of the web layers, the function layer and the data layer. The calculation of the resource use amount for each of the web layers, the function layer and the data layer allows further properly understanding the state of the computer system 1. The operation of the operation management apparatus 7 will be described below in detail.

Figure 4:
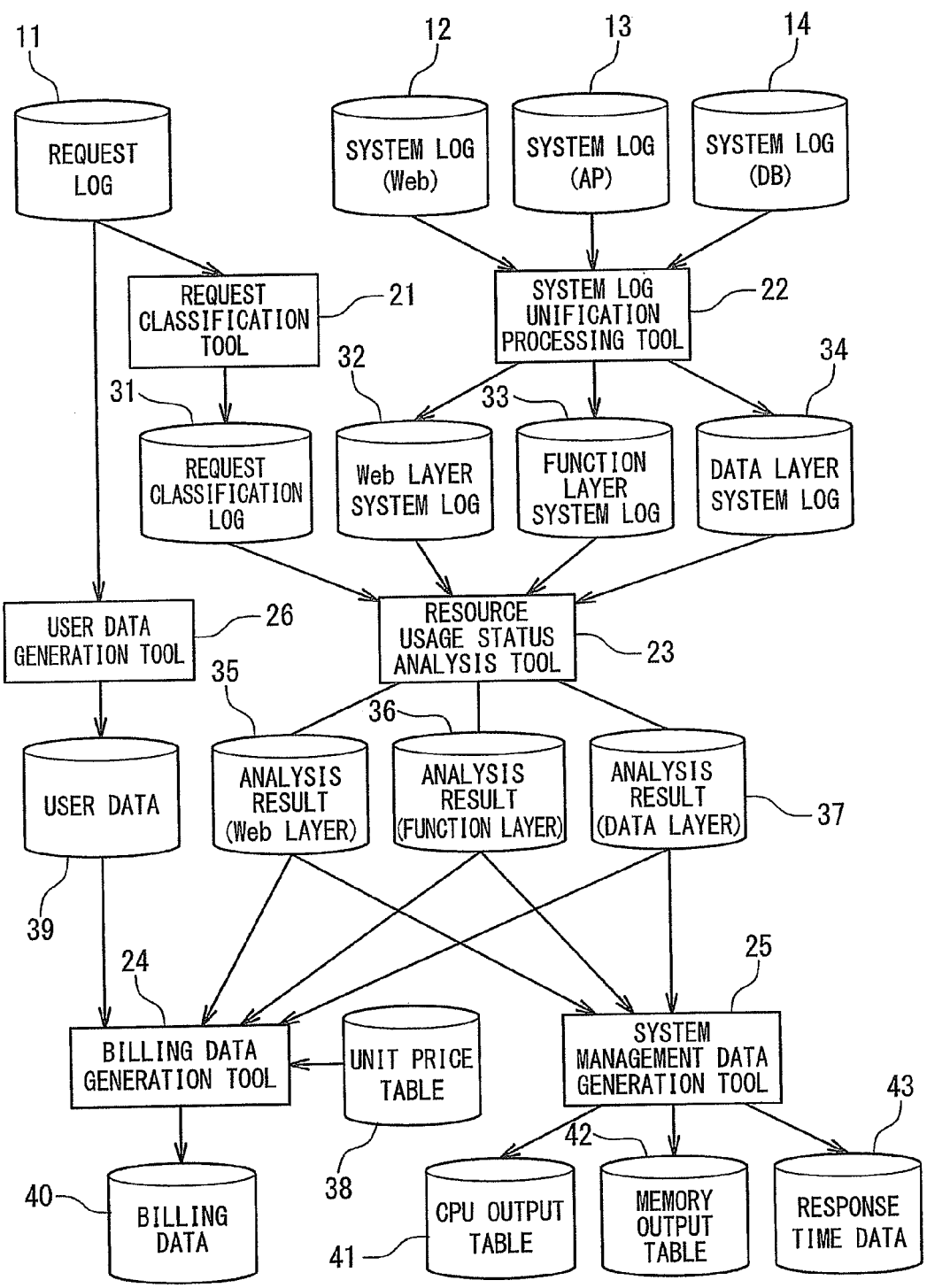
FIG. 4 is a block diagram showing the software configuration of an operation management apparatus.

FIG. 4 is the block diagram showing an example of the software configuration installed onto the operation management apparatus 7. A request classification tool 21, a system log unification processing tool 22, a resource usage status analysis tool 23, a billing data generation tool 24, a system management data generation tool 25 and a user data generation tool 26 are installed in the memory device of the operation management apparatus 7. The computer system 1 is operated and managed by these software programs.

The operation of the operation management apparatus 7 will be described below in detail.

The request classification tool 21 in the operation management apparatus 7 analyzes the request log 11 received from the load balancer 3 and calculates the number of the web requests handled by the computer system 1 for each measurement period and for each type of the web requests. The calculation result is held as a request classification log 31 in the memory device 7b.

FIG. 5 is a table showing the contents of the request classification log 31. In this exemplary embodiment, the request classification log 31 describes the number of the handled web requests at intervals of 5 minutes for each type of the web requests. In the example of FIG. 5, the request classification log 31 indicates that 20 web requests of the type "R1" (for example, the GET request) 10 web requests of the type "R2" (for example, the POST request) are handled in the period between 10:00 and 10:05.

On the other hand, the system log unification processing tool 22 generates a web layer system log 32, a function layer system log 33 and a data layer system log 34 on the basis of the system logs 12, 13 and 14, which are received from the Web servers 4, the AP servers 5 and the DB server 6, respectively. The web layer system log 32 is a record which describes the resource usage status in the entire web layer in each measurement period. The system log unification processing tool 22 generates the web layer system log 32 by unifying the system logs 12 received from the respective Web servers 4. In this exemplary embodiment, the system log unification processing tool 22 calculates the CPU usage rate for the entire web layer by averaging the CPU usage rates of the respective Web servers 4, whiling calculating the memory usage amount for the entire web layer by summing up the memory usage amounts of the respective Web servers 4. The calculated CPU usage rate and memory use amount are described in the web layer system log 32. Similarly, the function layer system log 33 and the data layer system log 34 are records which describe the resource usage statuses of the entire function layer and data layer, respectively, for each measurement period. In this exemplary embodiment, the system log 14 of the DB server 6 may be used in the entirety as the data layer system log 34, since the data layer is configured with the single DB server 6.

The resource usage status analysis tool 23 calculates the resource usage amount required to handle one web request on the basis of the request classification log 31, the web layer system log 32, the function layer system log 33 and the data layer system log 34, for each of the web, function and data layers and for each type of the web requests. In this exemplary embodiment, the resource usage status analysis tool 23 calculates the CPU time and memory usage amount required to handle a web request for each of the web, function and data layers.

The calculation of the CPU time and memory usage amount consumed in the web layer to handle one web request is executed as follows.

At first, a description is given of a case in which the length of all the measurement periods is a constant value $\Delta t$. The following equations are established:

$$\Delta t \cdot \rho^W(i) = \sum_j N_{Rj}(i) \cdot U_{Rj}^W + \Delta t \cdot \rho_Z^W, \quad (1a)$$

$$M^W(i) = \sum_j N_{Rj}(i) \cdot M_{Rj}^W + M_Z^W, \quad (1b)$$

where, for the measurement period "i", the CPU usage rate for the entire web layer is defined as $\rho^W(i)$, the memory usage amount as the entire web layer is defined as $M^W(i)$ the number of the treated web requests of a type "Rj" is $N_{Rj}(i)$, the CPU time of the web layer required to handle one web request of the type "Rj" is defined as $U_{Rj}^W$, and the memory usage amount is defined as $M_{Rj}^W$. It should be noted that $\Delta t$ is the length of each measurement period, $\rho_Z^W$ is the CPU usage rate as the entire web layer in the situation in which no web request is handled, and $M_Z^W$ is the memory use amount in the web layer in the situation in which no web request is handled. The symbol "$\Sigma$" means the sum of the web requests of all types. The number $N_{Rj}(i)$ of the web requests of the type "Rj" is described in the request classification log 31, and the CPU usage rate $\rho^W(i)$ and the memory use amount $M^W(i)$ as the entire web layer are described in the web layer system log 32.

It should be noted that resources are generally used to some extent in a computer system in order to maintain the operation thereof independently of the presence or absence of web requests. On a Web server running the Apache, for example, a predetermined number of processes are permanently operated, independently of the presence or absence of web requests. Therefore, the CPU and the memory are used to only maintain the processes in the executable state. In addition, processes for managing the system are often operated on a computer system, and the CPU and the memory are used for these processes. Hereafter, the CPU usage rate in the state in which no web request is handled (non-request handling state) is referred to as the default CPU usage rate, and the memory usage amount in the state in which no web request is handled is referred to as the default memory usage amount.

The problem for calculating the CPU time $U_{Rj}^W$ of the type "Rj" and $\Delta t \cdot \rho_z^W$ on the basis of the measurement values $\rho^W(1)$ to $\rho^W(m)$ and $N_{Rj}(1)$ to $N_{Rj}(m)$ can be solved by using the multiple regression analysis. Specifically, the CPU times $U_{R1}^W, U_{R2}^W, \ldots$, and $\Delta t \cdot \rho^W$ are calculated from the following equation:

$$\begin{bmatrix} U_{R1}^W \\ U_{R2}^W \\ \vdots \\ U_{Rn}^W \\ \Delta t \cdot \rho_Z^W \end{bmatrix} = ({}^tX\ X)^{-1}\, {}^tX \begin{bmatrix} \Delta t \cdot \rho^W(1) \\ \Delta t \cdot \rho^W(2) \\ \vdots \\ \Delta t \cdot \rho^W(m) \end{bmatrix}, \quad (2a)$$

where ${}^tX$ is the transposed matrix of the matrix X, and the matrix X is represented by the following equation:

$$X = \begin{bmatrix} N_{R1}(1) & N_{R2}(1) & \ldots & N_{Rn}(1) & 1 \\ N_{R1}(2) & N_{R2}(2) & \ldots & N_{Rn}(2) & 1 \\ \vdots & \vdots & \ddots & \vdots & \vdots \\ N_{R1}(m) & N_{R2}(m) & \ldots & N_{Rn}(m) & 1 \end{bmatrix}. \quad (2b)$$

It should be noted that the measurement number of times M is set to a value greater than the number n of the types of the web requests so that the inverse matrix of a matrix $({}^tX\ X)$ exists.

Correspondingly, the memory usage amounts $M_{R1}^W$, $M_{R2}^W, \ldots$ and $M_Z^W$ are calculated by the following equation:

$$\begin{bmatrix} M_{R1}^W \\ M_{R2}^W \\ \vdots \\ M_{Rn}^W \\ M_Z^W \end{bmatrix} = ({}^tX\ X)^{-1}\, {}^tX \begin{bmatrix} M^W(1) \\ M^W(2) \\ \vdots \\ M^W(m) \end{bmatrix}, \quad (3)$$

The calculated CPU times $U_{R1}^W, U_{R2}^W, \ldots U_{Rn}^W$, the default CPU usage rate $\rho_Z^W$, the memory use amounts $M_{R1}^W$, $M_{R2}^W, \ldots, M_{Rn}^W$ and the default memory use amount $M_Z^W$ are held as analysis result data 36 of the web layer in the memory device 7b.

The similar procedure is performed on the function layer and the data layer. The CPU times and memory usage amounts which are consumed in the function layer in order to handle one web request, and the default CPU usage rate and default memory usage amount of the function layer are calculated on the basis of the request classification log 31 and the function layer system log 33 by using the procedure similar to the above-described procedure. The calculated CPU time, memory usage amount, default CPU usage rate and default memory use amount are held as the analysis result data 36 of the function layer in the memory device 7b. Hereafter, the CPU time and memory use amount, which are consumed to handle one web request of the type "Rj" in the function layer are denoted by $U_{Rj}^F$ and $M_{Rj}^F$, respectively, and the default CPU usage rate and memory usage amount of the function layer are denoted as $\rho_Z^F$ and $M_Z^F$, respectively.

Similarly, the CPU time and memory use amount which are consumed in the data layer to handle one web request and the default CPU usage rate and default memory use amount of the data layer are calculated from the request classification log 31 and the data layer system log 34 by using the procedure similar to the above-described procedure. The calculated CPU time, memory use amount, default CPU use time and default memory use amount are held as an analysis result data 37 of the data layer in the memory device 7b. Hereafter, the CPU time and memory use amount, which are consumed to handle one web request of the type "Rj" in the data layer are denoted by $U_{Rj}^D$ and $M_{Rj}^D$, respectively, and the default CPU time and memory use amount of the function layer are denoted by $\rho_Z^D$ and $M_Z^D$ respectively.

The lengths of the respective measurement periods may be allowed to be different. In this case, the following equation is established instead of the equation (1a):

$$\Delta t(i) \cdot \rho^W(i) = \sum_j N_{Rj}(i) \cdot U_{Rj}^W + \Delta t(i) \cdot \rho_Z^W. \tag{1a'}$$

Here, $\Delta t(i)$ is the length of the measurement period "i". It should be noted that the equation (1b) is still established even when the lengths of the respective measurement periods are allowed to be different.

The use of the relations of the equations (1a') and (1b) allows calculating the CPU time $U_{Rj}^W$ and default CPU usage rate $\rho_Z^W$ of the web request of the type "Rj" through a multiple regression analysis for the case where the lengths of the respective measurement periods are allowed to be different. Specifically, the CPU times $U_{R1}^W, U_{R2}^W, \ldots,$ and $\rho_Z^W$ can be calculated from the measurement values $\rho^W(1)$ to $\rho^W(m)$, $N_{Rj}(1)$ to $N_{Rj}(m)$ and the length $\Delta t(i)$ of each measurement period by using the following equation:

$$\begin{bmatrix} U_{R1}^W \\ U_{R2}^W \\ \vdots \\ U_{Rn}^W \\ \rho_Z^W \end{bmatrix} = ({}^t Y \ Y)^{-1} \, {}^t Y \begin{bmatrix} \Delta t(1) \cdot \rho^W(1) \\ \Delta t(2) \cdot \rho^W(2) \\ \vdots \\ \Delta t(m) \cdot \rho^W(m), \end{bmatrix} \tag{2a'}$$

where ${}^t Y$ is the inverse matrix of the matrix Y represented by the following equation:

$$Y = \begin{bmatrix} N_{R1}(1) & N_{R2}(1) & \ldots & N_{Rn}(1) & \Delta t(1) \\ N_{R1}(2) & N_{R2}(1) & \ldots & N_{Rn}(2) & \Delta t(2) \\ \vdots & \vdots & \ddots & \vdots & \vdots \\ N_{R1}(m) & N_{R2}(m) & \ldots & N_{Rn}(m) & \Delta t(m) \end{bmatrix}, \tag{2b'}$$

Correspondingly, the memory usage amounts $M_{R1}^W$, $M_{R2}^W, \ldots, M_{Rn}^W$ and the default memory usage amount $M_Z^W$ can be calculated by using the following equation:

$$\begin{bmatrix} M_{R1}^W \\ M_{R2}^W \\ \vdots \\ M_{Rn}^W \\ M_Z^W \end{bmatrix} = ({}^t Y \ Y)^{-1} \, {}^t Y \begin{bmatrix} M^W(1) \\ M^W(2) \\ \vdots \\ M^W(m), \end{bmatrix} \tag{3'}$$

Although CPU time and the memory usage amount are analyzed in the above-mentioned exemplary embodiment, the similar analysis may be applied to other resources. For example, the similar analysis may be applied to the usage amount of network interfaces (usually, byte/sec) or the usage amount of disc interfaces or SCSI interfaces (usually, byte/sec). "Read" and "write" operations may be separately analyzed for the usage amounts of the network interface and the disc interface. The usage rate of the disc interfaces may be analyzed instead of the usage amount of the disc interfaces. In this case, the usage rate $\pi$ of a disc interface may be defined with the queue length W of the disc by the following equation:

$$\pi = Q/(Q+1).$$

The analysis result data 35, 36 and 37 of the web, function and data layers are obtained by the resource usage status analysis tool 23 (namely, the CPU times, the memory use amounts, the default CPU usage rates and the default memory use amounts which are consumed in the web, function and data layers, respectively, to handle one web request) are used for the following two purposes. First, the analysis result data 35, 36 and 37 of the web, function and data layers are used for the billing to the user. On the basis of the analysis result data 35, 36 and 37, the unit price charged for the processing of one web request is calculated for each type of the web requests. The fee charged to each user is determined in accordance with the calculated price and the number of the web requests.

Second, the analysis result data 35, 36 and 37 of the web, function and data layers are used to analyze the load and performance of the computer system 1 in terms of the types of the web requests. For example, the usage rate of a specific resource in each measurement period is analyzed for each type of the web requests by using the analysis result data 35, 36 and 37. Also, the usage rate of each resource in a specific measurement period is analyzed for each type of the web requests by using the analysis result data 35, 36 and 37.

The billing processing executed in this exemplary embodiment and the analysis of the load and performance of the computer system 1 will be described below in detail.

(Billing Processing)

Basically, the use fee charged to each user is desired to be determined on the basis of the resource usage amount required to handle web requests issued by the each user.

One problem is that resources are consumed to maintain the operation of the computer system 1, irrespectively of the presence or absence of web requests. In particular, the memory is consumed in order to make a process ready for execution, even when no web request is handled, and therefore a large amount of the memory is used irrespectively of the presence or absence of web requests. In such situation, there is a case that the use fee is desired to be charged to each user also for the resource usage amount necessary for maintaining the operation of the computer system 1 (hereafter, such resource usage amount is referred to as the common resource usage amount).

The billing processing executed in this exemplary embodiment attains the billing suitable for the common resource usage amount through distributing the use fee for the common resource usage amount to the respective web requests. In the following, a description is given of the billing processing executed in this exemplary embodiment. It should be noted that, although the billing processing for the web layer will be described below as one exemplary embodiment, the same processing method is applicable to the other two layers (the function layer and the data layer).

As shown in FIGS. 6A and 6B, a unit price table 38 is prepared onto the memory device 7b in the operation management apparatus 7, and the unit price table 38 is used in the billing processing. When the length of all the measurement periods is a constant value of $\Delta t$, the CPU unit price and memory unit price per measurement period (5 minutes in this exemplary embodiment) are described in the price table 38, for each of the web, function and data layers, as shown in FIG. 6A, in one exemplary embodiment. Hereafter, the CPU unit price per measurement period (5 minutes in this exemplary embodiment) in the web layer is denoted by $C_{CPU}{}^W$, and the memory unit price per measurement period is denoted by $C_M{}^W$.

When the length of the measurement period is variable, on the other hand, the CPU unit price and memory unit price per unit time may be described in the unit price table 38, for each of the web, function and data layer. In this case, the CPU price in the measurement period "i" in the web layer is $\Delta t(i) \cdot C_{CPU}{}^W$, when the CPU unit price per unit time in the web layer is $c_{CPU}{}^W$. Correspondingly, the memory price in the measurement period "i" in the web layer is $\Delta t(i) \cdot C_M{}^W$, when the memory unit price per unit time in the web layer is $C_M{}^W$.

Instead, as shown in FIG. 6B, the computer system operation cost of the web layer per measurement period (or per unit time), the contribution rates of the CPU and memory may be described in the unit price table 38. When the length of all the measurement periods is constant, the CPU unit price per measurement period is calculated by multiplying the computer system operation cost per measurement period by the contribution rate of the CPU. In addition, the memory unit price per measurement period is calculated by multiplying the computer system operation cost of the web layer by the contribution rate of the memory. When the length of the measurement period is variable, on the other hand, the CPU unit price per unit time is calculated by multiplying the computer system operation cost per unit time by the contribution rate of the CPU. In addition, the memory unit price per unit time is calculated by multiplying the computer system operation cost of the web layer by the contribution rate of the memory.

The billing data generation tool 24 determines the unit price of the web layer for one web request by using the analysis result data 35 of the web layer, the CPU price $C_{CPU}{}^W$ and the memory price $C_M{}^W$, which are described in the unit price table 38. Specifically, the price $\mu_{Rj}{}^W(i)$ of the web layer for handling one web request of the type "Rj" in the measurement period "i" is determined as follows:

In the measurement period "i", the CPU time consumed to handle the web request(s) of the type "Rj" is $N_{Rj}(i) \cdot U_{Rj}{}^W$. Also, in each measurement period, the default CPU time consumed independently of the handling of web requests is $\Delta t \cdot \rho_Z{}^W$ for the case when the length of all the measurement periods is the constant value $\Delta t$, and is $\Delta t(i) \cdot \rho_Z{}^W$ for the case when the lengths of the measurement periods are allowed to be different.

In this exemplary embodiment, a "virtual CPU consumption time" in the web layer is determined by distributing the default CPU time $\Delta t \cdot \rho_Z{}^W$ consumed in the web layer independently of the handling of web requests to the respective types of the web requests. Specifically, when the length of all the measurement periods is constant, the virtual CPU consumption time CPU_Rj$^W(i)$ in the web layer for the web request(s) of the type "Rj" in the measurement period "i" is calculated by using the following equation:

$$\text{CPU\_Rj}^W(i) = N_{Rj}(i) \cdot U_{Rj}^W + \Delta t \cdot \rho_Z^W \cdot \frac{N_{Rj}(i) \cdot U_{Rj}^W}{\sum_j N_{Rj}(i) \cdot U_{Rj}^W}, \quad (4)$$

The first term of the equation (4) is the CPU time that is actually consumed in the web layer to handle the web request(s) of the type "Rj", as mentioned above. On the other hand, the second term corresponds to the assignment to the web request(s) of the type "Rj" of the default CPU time $\Delta t \cdot \rho_Z{}^W$ consumed in the web layer independently of the handling of web requests.

When the lengths of the measurement periods are allowed to be different, on the other hand, the virtual CPU consumption time CPU_Rj$^W(i)$ is calculated by using the following equation:

$$\text{CPU\_Rj}^W(i) = N_{Rj}(i) \cdot U_{Rj}^W + \Delta t(i) \cdot \rho_Z^W \cdot \frac{N_{Rj}(i) \cdot U_{Rj}^W}{\sum_j N_{Rj}(i) \cdot U_{Rj}^W}, \quad (4')$$

With the use of the above-calculated virtual CPU time, the CPU unit price $\mu_{Rj}{}^{CPU}(i)^W$ of the web layer for one web request of the type "Rj" in the measurement period "i" is calculated by using the following equation for the case when the length of all the measurement periods is constant:

$$\mu_{Rj}^{CPU}(i)^W = \frac{1}{N_{Rj}(i)} \cdot C_{CPU}^W \cdot \frac{\text{CPU\_Rj}^W(i)}{\sum_j \text{CPU\_Rj}^W(i)}, \quad (5)$$

and is calculated by the following equation:

$$\mu_{Rj}^{CPU}(i)^W = \frac{1}{N_{Rj}(i)} \cdot c_{CPU}^W \cdot \Delta t(i) \cdot \frac{\text{CPU\_Rj}^W(i)}{\sum_j \text{CPU\_Rj}^W(i)}, \quad (5')$$

for the case when the lengths of the measurement periods are allowed to be different.

The memory unit price $\mu_{Rj}{}^M(i)^W$ of the web layer is similarly calculated for the memory usage amount. Specifically, a "virtual memory usage amount" M_Rj$^W(i)$ in the web layer of the web request(s) of the type "Rj" in the measurement period "i" is calculated by using the following equation:

$$\text{M\_Rj}^W(i) = N_{Rj}(i) \cdot M_{Rj}^W + M_Z^W \cdot \frac{N_{Rj}(i) \cdot M_{Rj}^W}{\sum_j N_{Rj}(i) \cdot M_{Rj}^W}, \quad (6)$$

where $M_{Rj}{}^W$ is the memory usage amount in the web layer to handle one web request of the type "Rj", and $\rho_Z{}^W$ is the default memory usage amount of the web layer.

Furthermore, the memory unit price $\mu_{Rj}{}^M(i)^W$ of the web layer for one web request of the type "Rj" in the measurement period "i" is calculated by using the following equation:

$$\mu_{Rj}^M(i)^W = \frac{1}{N_{Rj}(i)} \cdot C_M^W \cdot \frac{\text{M\_Rj}^W(i)}{\sum_j \text{M\_Rj}^W(i)}, \quad (8)$$

and is calculated by using the following equation.

$$\mu_{Rj}^M(i)^W = \frac{1}{N_{Rj}(i)} \cdot c_M^W \cdot \Delta t(i) \cdot \frac{\text{M\_Rj}^W(i)}{\sum_j \text{M\_Rj}^W(i)}, \quad (8')$$

for the case when the lengths of the measurement periods are allowed to be different.

The unit price $\mu_{Rj}^W(i)$ of the web layer for one web request of the type "Rj" in the measurement period "i" is calculated as the sum of the CPU unit price $\mu_{Rj}^{CPU}(i)^W$ and the memory unit price $\mu_{Rj}^M(i)^W$. That is, the unit price $\mu_{Rj}^W(i)$ of the web layer for one web request is calculated by using the following equation:

$$\mu_{Rj}^W(i) = \mu_{Rj}^{CPU}(i)^W + \mu_{Rj}^M(i)^W, \quad (9)$$

Moreover, the number of the web requests issued by each user in a targeted measurement period is calculated for each type of the web requests by the user data generation tool 26, and user data 39 indicating the result are held in the memory device 7b. FIG. 7 is a table showing an example of the contents of the user data 39. In the example of FIG. 7, the counting period is 5 minutes. In the table of FIG. 7, "$N_{RjUk}(i)$" means the number of the web requests of the type "Rj", which are issued by the user Uk in the measurement period "i".

The billing data generation tool 24 calculates the fee $F_{Uk}^W(i)$ for the web layer which is to be charged to each user Uk in the measurement period "i", on the basis of the unit price $\mu_{Rj}^W(i)$ of the web layer for one web request, which is calculated as mentioned above, and the user data 39, by using the following equation:

$$F_{Uk}^W(i) = \Sigma \mu_{Rj}^W(i) \cdot N_{RjUk}(i), \quad (10a)$$

where $\Sigma$ means the sum for all the types of the web requests.

The unit price for one web request and the fee to be charged to the user are similarly determined for the other two layers, namely, the function layer and the data layer. Specifically, the billing data generation tool 24 calculates the fee $F_{Uk}^F(i)$ of the function layer and the fee $F_{Uk}^D(i)$ of the data layer by using the following equation:

$$F_{Uk}^F(i) = \Sigma \mu_{Rj}^F(i) \cdot N_{RjUk}(i), \quad (10b)$$

$$F_{Uk}^D(i) = \Sigma \mu_{Rj}^D(i) \cdot N_{RjUk}(i), \quad (10c)$$

where $\mu_{Rj}^F(i)$ and $\mu_{Rj}^D(i)$ are unit prices of the function layer and the data layer, respectively for one web request. Moreover, the billing data generation tool 24 calculates the fee $F_{Uk}(i)$ to be charged to each user Uk by using the following equation:

$$F_{Uk}(i) = F_{Uk}^W(i) + F_{Uk}^F(i) + F_{Uk}^D(i). \quad (11)$$

The billing data generation tool 24 generates billing data 40 which describe the fees $F_{Uk}(i)$, $F_{Uk}^W(i)$, $F_{Uk}^F(i)$ and $F_{Uk}^D(i)$ to be charged to each user Uk, and holds the billing data 40 in the memory device 7b.

(Analysis of Load and Performance of Computer System)

The analysis of the load and performance of the computer system 1 is executed by the system management data generation tool 25. Specifically, the system management data generation tool 25 generates the following data on the basis of the analysis result data 35, 36 and 37 of the web, function and data layers.

First, the system management data generation tool 25 has a function for calculating the usage rate and usage amount of the resources in each of the Web, function, and data layers, for each type of web requests and each measurement period. In this exemplary embodiment, the system management data generation tool 25 calculates the CPU usage rates in the respective layers on the basis of the analysis result data 35, 36 and 37 of the web, function and data layers for each type of web requests and each measurement period, and stores a CPU output table 41 which describes the calculated CPU usage rate in the memory device 7b. In the measurement period "i", the CPU usage rate $\Psi_{Rj}^W(i)$ in the web layer, the CPU usage rate $\Psi_{Rj}^F(i)$ in the function layer and the CPU usage rate $\Psi_{Rj}^D(i)$ in the data layer are calculated for web requests of the type "Rj" by using the following equations, respectively, for the case when the length of all the measurement periods is constant:

$$\Psi_{Rj}^W(i) = N_{Rj}(i) \cdot U_{Rj}^W/\Delta t, \quad (12a)$$

$$\Psi_{Rj}^F(i) = N_{Rj}(i) \cdot U_{Rj}^F/\Delta t, \text{ and} \quad (12b)$$

$$\Psi_{Rj}^D(i) = N_{Rj}(i) \cdot U_{Rj}^D/\Delta t, \quad (12c)$$

and are calculated by using the following equations, for the case when the lengths of the measurement periods are allowed to be different:

$$\Psi_{Rj}^W(i) = N_{Rj}(i) \cdot U_{Rj}^W/\Delta t, \quad (12a')$$

$$\Psi_{Rj}^F(i) = N_{Rj}(i) \cdot U_{Rj}^F/\Delta t, \text{ and} \quad (12b')$$

$$\Psi_{Rj}^D(i) = N_{Rj}(i) \cdot U_{Rj}^D/\Delta t, \quad (12c')$$

FIG. 8A shows the contents of the portion of the CPU output table 41 corresponding to the web layer. It should be noted that the 'CPU usage rate $\Psi_{Rj}^W(i)$ in the web layer for web requests of the "type Rj"' is not calculated for one web request of the "type Rj" but is calculated for the complete set of the web requests of the "type Rj". The same goes for the CPU usage rates $\Psi_{Rj}^F(i)$ and $\Psi_{Rj}^D(i)$ in the function layer and the data layer.

Furthermore, the system management data generation tool 25 calculates the memory usage amount in each of the web, function and data layers for each type of web requests and each measurement period, and stores a memory output table 42 which describes the calculated memory usage amounts in the memory device 7b. FIG. 8B is a table showing the contents of the portion of the memory output table 42 corresponding to the web layer. In this exemplary embodiment, the memory usage amount $\Phi_{Rj}^W(i)$ in the web layer for the web request(s) of the type "Rj" in the measurement period "i", the memory usage amount $\Phi_{Rj}^F(i)$ in the function layer, and the memory usage amount $\Phi_{Rj}^D(i)$ in the data layer are calculated, respectively, by using the following equations:

$$\Phi_{Rj}^W(i) = N_{Rj}(i) \cdot M_{Rj}^W/\Delta t, \quad (13a)$$

$$\Phi_{Rj}^F(i) = N_{Rj}(i) \cdot M_{Rj}^F/\Delta t, \text{ and} \quad (13b)$$

$$\Phi_{Rj}^D(i) = N_{Rj}(i) \cdot M_{Rj}^D/\Delta t, \quad (13c)$$

FIG. 8B shows the contents of the portion of the memory output table 42 corresponding to the web layer.

Figure 9A:
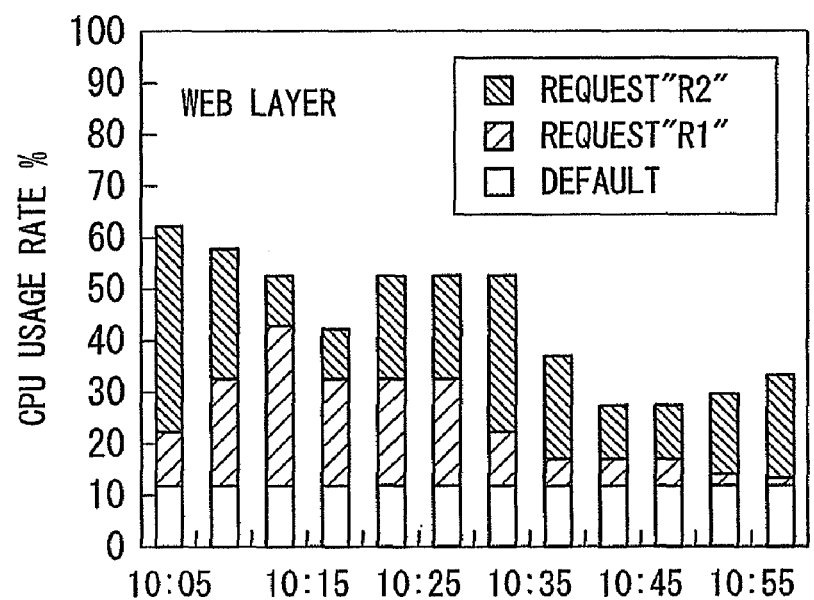
FIG. 9A is an example of a graph showing a CPU usage rate for each type of web requests.

Moreover, the system management data generation tool 25 has a function for displaying the contents of the CPU output table 41 and the memory output table 42 with a graph. Specifically, the system management data generation tool 25 has a function for displaying the usage rate and usage amount of the resources for each type of web requests in each measurement period as the graph. For example, as shown in FIG. 9A, the system management data generation tool 25 displays the CPU usage rate and default CPU usage rate of the web layer for each type of the web requests in each measurement period, as the graph. The system management data generation tool 25 is configured to display the similar graph with regard to the memory usage amount. Such graphs are useful for understanding the current state of the computer system 1.

Figure 9B:
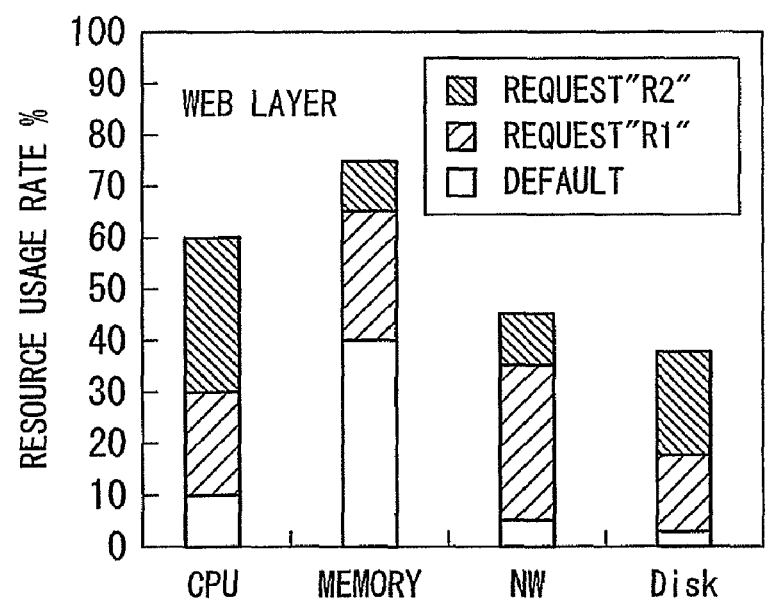
FIG. 9B is an example of a graph showing a usage rate of each resource in a particular measurement period, for each type of web requests.

Moreover, the system management data generation tool 25 has a function for displaying the usage status of each resource in a specific measurement period for each type of the web requests. For example, the system management data generation tool 25 displays the CPU usage rate of the web layer, the memory usage rate, the network usage rate and the disc usage rate in the particular measurement period (between 10:00 and 10:05 in FIG. 9B), as the graph for each type of the web requests, as shown in FIG. 9B. The memory usage rate of the web layer of the web request of the type "Rj" is the value obtained by dividing the actual memory usage amount $M_{Rj}^W$ of the web layer by the entire memory amount managed by the operating system. The entire memory amount managed by an operating system is usually managed by the operating system. Defining the usage state of the memory as the memory usage rate, as shown in FIG. 9B, allows collectively displaying the usage statuses of multiple resources on a single graph in which the longitudinal axis is defined as the "resource usage rate (%)". As is the case of the graph of FIG. 9A, the graph of FIG. 9B is useful for understanding the current status of the computer system 1. It should be noted that the system management data generation tool 25 may additionally have a function for displaying the usage status of each resource in a plurality of measurement periods (for example, the two measurement periods between 10:00 and 10:05 and between 10:05 and 10:10), for each web request. Specifically, the usage status of each resource in a plurality of measurement periods may be displayed on a graph in the same way as the foregoing case, after the resource usage rates of the respective measurement periods are calculated and the average value thereof is then calculated.

When the CPUs and memories integrated within the web layer, the function layer and the data layer have the same functions and performances, it is useful to calculate the usage rate and usage amount of the resources for the entire computer system 1, for each type of the web requests and each measurement period. In one exemplary embodiment, the CPU usage rate and memory usage amount of the entire computer system 1 are calculated for each type of the web requests and each measurement period. Specifically, the CPU usage rate $\Psi_{Rj}(i)$ of the entire computer system 1 for the web request of the type "Rj" in the measurement period "i" is calculated by using the following equation for the case when the length of all the measurement periods is constant:

$$\Psi_{Rj}(i)=N_{Rj}(i)\cdot U_{Rj}/\Delta t, \tag{14a}$$

and is calculated by using the following equation for the case when the lengths of the measurement periods are allowed to be different:

$$\Psi_{Rj}(i)=N_{Rj}(i)\cdot U_{Rj}/\Delta t(i), \tag{14a'}$$

where $U_{Rj}$ is the sum of the CPU times consumed by one web request of the type "Rj" in the web, function and data layers, defined by the following equation:

$$U_{Rj}=U_{Rj}^W+U_{Rj}^F+U_{Rj}^D, \tag{14b}$$

On the other hand, the memory use amount $\Phi_{Rj}(i)$ as the entire computer system 1 of the web request of the type "Rj" in the measurement period "i" is calculated by using the following equation:

$$\Phi_{Rj}(i)=N_{Rj}(i)\cdot M_{Rj}, \tag{15a}$$

where $M_{Rj}$ is the sum of the memory usage amounts of one web request of the type "Rj" in the web, function, and data layers, defined by the following equation:

$$M_{Rj}=M_{Rj}^W+M_{Rj}^F+M_{Rj}^D, \tag{15b}$$

Moreover, the system management data generation tool 25 has a function for estimating the response time of a web request when the load of the computer system 1 is relatively light, for each type of web requests. The response time is a parameter effective for analyzing the performance of the computer system 1. Specifically, the system management data generation tool 25 calculates the response time $T_{Rj}$ of the web request of the type "Rj" by the following equation:

$$T_{Rj}=U_{Rj}^W+U_{Rj}^F+U_{Rj}^D, \tag{15}$$

As mentioned above, $U_{Rj}^W$, $U_{Rj}^F$ and $U_{Rj}^D$ are the CPU times used to handle one web request of the type "Rj" in the web layer, the function layer and the data layer, respectively. The sum of the CPU times approximately coincides with the response time when the load is relatively light. The calculated response time is stored as response time data 43 in the memory device 7b.

Usually, obtaining the response time in the state in which the load is relatively light requires preparing a dedicated experimental environment and carrying out a measurement therein. However, the use of the approach of this exemplary embodiment allows measuring the response time in the actual operating environment in which any requests are continuously handled. This eliminates the need for preparing a dedicated experimental environment.

Although preferred exemplary embodiments of the present invention are described above, the present invention may be variously varied and should not be construed limitedly to the above-mentioned exemplary embodiments.

For example, the type of the web request is defined with the method included therein in the above-mentioned exemplary embodiments; however, the type of the web request may be differently defined. For example, the type of the web request may be defined with the URL referred to by the web request.

Also, although the computer system 1 is layered into the three layers composed of the web layer, the function layer and the data layer in this exemplary embodiment, the present invention may be applied to a computer system layered into two layers, four layers or more. Also, the present invention may be applied to a computer system that is not layered.

The invention claimed is:

1. A computer system which handles web requests received from clients, comprising:
   a request classification log generating tool generating a request classification log which describes a number of web requests handled by said computer system in each of at least one measurement period for each of at least one type of said web requests;
   a system log generating tool generating a system log which describes a status of resources of said computer system in said each measurement period; and
   a resource usage status calculation tool, implemented by a hardware processor, calculating a request handling resource usage amount per web request by using said request classification log and said system log for each type of said web requests, the request handling resource usage amount being a usage amount of resources used for handling said web requests,
   wherein said resource usage status calculation tool calculates said request handling resource usage amount through performing multiple linear regression analysis on a number of web requests of each type of said web requests in said each measurement period described in said request classification log and a usage status of resources of said computer system described in said system log for said each measurement period,
   wherein a web layer is formed by at least one web server in said computer system,
   wherein said multiple linear regression analysis are performed for measurement periods "1" to "m", m being a measurement number of times,
   wherein a type of each of said web requests is any of web request types "R1" to "Rn", n being the number of types of said web requests,
   wherein a CPU time $U_{Rj}^W$ of the web request type "Rj" and $\Delta t \cdot \rho_z^w$ are calculated for i ranging from 1 to n in accordance with the following equation:

$$\begin{bmatrix} U_{R1}^W \\ U_{R2}^W \\ \vdots \\ U_{Rn}^W \\ \Delta t \cdot \rho_Z^W \end{bmatrix} = ({}^tX\ X)^{-1}{}_t X \begin{bmatrix} \Delta t \cdot \rho^W(1) \\ \Delta t \cdot \rho^W(2) \\ \vdots \\ \Delta t \cdot \rho^W(m) \end{bmatrix},$$

where $\Delta t$ is a length of each of said measurement periods, $\rho^w(i)$ is a CPU usage rate for entire said web layer for the measurement period "i", $\rho_z{}^w$ is a CPU usage rate for the entire said web layer in a situation in which no web request is handled, and ${}^tX$ is a transposed matrix of matrix X represented by the following equation:

$$X = \begin{bmatrix} N_{R1}(1) & N_{R2}(1) & \ldots & N_{Rn}(1) & 1 \\ N_{R1}(2) & N_{R2}(2) & \ldots & N_{Rn}(2) & 1 \\ \vdots & \vdots & \ddots & \vdots & \vdots \\ N_{R1}(m) & N_{R2}(m) & \ldots & N_{Rn}(m) & 1 \end{bmatrix},$$

$N_{Rj}(i)$ being a number of treated web requests of the web request type "Rj" in the measurement period "i", wherein a memory usage amount $M_{rj}{}^w$ of the web request type "Rj" and a memory use amount $M_Z{}^W$ in said web layer in the situation in which no web request is handled are calculated for i ranging from 1 to n by using the following equation:

$$\begin{bmatrix} M_{R1}^W \\ M_{R2}^W \\ \vdots \\ M_{Rn}^W \\ M_Z^W \end{bmatrix} = ({}^tX\ X)^{-1}{}_t X \begin{bmatrix} M^W(1) \\ M^W(2) \\ \vdots \\ M^W(m) \end{bmatrix},$$

wherein $M^W(i)$ is a memory usage amount for the entire said web layer for the measurement period "i", and wherein m is set to a value greater than the number n of the types of the web requests so that an inverse matrix of the matrix $({}^tX\ X)$ exists.

2. The computer system according to claim 1, further comprising a plurality of layered servers,
wherein said system log generating tool generates said system log for each layer of said plurality of servers; and
wherein said resource usage status calculation tool calculates said request handling resource usage amount for each layer of said plurality of servers.

3. The computer system according to claim 2, wherein said plurality of servers includes:
at least one web server forming said web layer;
an application server connected to said web server to form an application layer; and
a database server connected to said application to form a data layer;
wherein said system log generating tool generates said system log for each of said web layer, said application layer and said data layer, and
wherein said resource usage status calculation tool calculates said request handling resource usage amount for each of said web layer, said application layer and said data layer.

4. The computer system according to claim 2, further comprising system management data generating tool,
wherein said system log describes a usage status of CPUs of said computer system for said each measurement period,
wherein said resource usage status calculating tool calculates CPU times for said each measurement period and per web request, during which said CPUs are used in each of layers of said plurality of servers for handling said web requests, and
wherein said system management data generating tool calculates a response time to said web requests for each type of said web requests through summing up said CPU times of the respective layers of said plurality of servers.

5. The computer system according to claim 1, further comprising:
a load balancer receiving said web request from said clients and distributing said web requests to said web servers,
wherein said load balancer generates a request log describing clock times when said web requests were handled and types of said web requests for each of said web requests received by said computer systems, and
wherein said request classification log generating tool generates said request classification log from said request log.

6. The computer system according to claim 1, further comprising:
a billing data generating tool generating billing data indicative of a use fee to be charged to a user by using said request handling resource usage amount.

7. The computer system according to claim 6, wherein said resource usage status calculation tool calculates a default resource usage amount which is a usage amount of resources used independently of said web requests, and
wherein said billing data generating tool calculates a virtual resource usage amount for each type of said web requests by distributing said default resource usage amount in accordance to the ratios of usage amounts of respective types of said web requests, and calculates said use fee from said request handling resource usage amount and said virtual resource usage amount.

8. The computer system according to claim 7, further comprising user data generating tool generating, from a request log which describes for each web request received by said computer system a user ID of a user who issues said each web request and a type of said each web request, user data describing a number of said web requests issued by said user for each type of said web requests,
wherein said billing data generating tool calculates a unit price which is a fee charged to said web requests per web request from said virtual resource usage amount and calculates said use fee from said unit price and said user data.

9. The computer system according to claim 1, further comprising:
a system management data generating tool calculating a usage status of said resources for each type of the web requests in said each measurement period from said request handling resource usage amount, and displaying the calculated usage status of said resources on a graph.

10. The computer system according to claim 9, wherein said system management data generating tool displays on said graph the usage status of said resources for each type of the web requests in said each measurement period.

11. The computer system according to claim 9, wherein said system management data generating tool displays on said graph a usage rate of each of said resources in one or more measurement period for each type of said web requests.

12. A computer system which handles web requests received from clients, comprising:
   a request classification log generating tool generating a request classification log which describes a number of web requests handled by said computer system in each of at least one measurement period for each of at least one type of said web requests;
   a system log generating tool generating a system log which describes a status of resources of said computer system in said each measurement period; and
   a resource usage status calculation tool, implemented by a hardware processor, calculating a request handling resource usage amount per web request by using said request classification log and said system log for each type of said web requests, the request handling resource usage amount being a usage amount of resources used for handling said web requests, and
   wherein said resource usage status calculation tool calculates said request handling resource usage amount through performing multiple linear regression analysis on a number of web requests of each type of said web requests in said each measurement period described in said request classification log and a usage status of resources of said computer system described in said system log for said each measurement period,
   wherein a web layer is formed by at least one web server in said computer system,
   wherein said multiple linear regression analysis are performed for measurement periods "1" to "m", m being a measurement number of times,
   wherein a type of each of said web requests is any of web request types "R1" to "Rn", n being the number of types of said web requests,
   wherein a CPU time $U^W_{Rj}$ of the web request type "Rj" and $\rho_z^w$ are calculated for i ranging from 1 to n by using the following equation:

$$\begin{bmatrix} U^W_{R1} \\ U^W_{R2} \\ \vdots \\ U^W_{Rn} \\ \rho^W_Z \end{bmatrix} = ({}^tY\ Y)^{-1}{}^tY \begin{bmatrix} \Delta t(1) \cdot \rho^W(1) \\ \Delta t(2) \cdot \rho^W(2) \\ \vdots \\ \Delta t(m) \cdot \rho^W(m), \end{bmatrix},$$

wherein $\Delta t$ (i) is a length of the measurement period "i", $\rho^w(i)$ is CPU usage rate for entire said web layer for the measurement period "i", $\rho_z^w$ is a CPU usage rate for the entire said web layer in a situation in which no web request is handled, and ${}^tY$ is a transposed matrix of a matrix Y represented by the following equation:

$$Y = \begin{bmatrix} N_{R1}(1) & N_{R2}(1) & \cdots & N_{Rn}(1) & \Delta t(1) \\ N_{R1}(2) & N_{R2}(1) & \cdots & N_{Rn}(2) & \Delta t(2) \\ \vdots & \vdots & \ddots & \vdots & \vdots \\ N_{R1}(m) & N_{R2}(m) & \cdots & N_{Rn}(m) & \Delta t(m) \end{bmatrix},$$

$N_{Rj}$ (i) being a number of treated web requests of the web request type "Rj" in the measurement period "i",
   wherein a memory usage amount $M^W_{RJ}$ of the web request type "Rj" and a memory use amount $M^W_Z$ in said web layer in the situation in which no web request is handled are calculated for i ranging from 1 to n by using the following equation:

$$\begin{bmatrix} M^W_{R1} \\ M^W_{R2} \\ \vdots \\ M^W_{Rn} \\ M^W_Z \end{bmatrix} = ({}^tY\ Y)^{-1}{}^tY \begin{bmatrix} M^W(1) \\ M^W(2) \\ \vdots \\ M^W(m), \end{bmatrix},$$

where $M^W$(i) is a memory usage amount for the entire said web layer for the measurement period "i", and
   wherein m is set to a value greater than the number n of the types of the web requests so that an inverse matrix of the matrix (${}^tY\ Y$) exists.

13. The computer system according to claim 12, further comprising a plurality of layered servers,
   wherein said system log generating tool generates said system log for each layer of said plurality of servers; and
   wherein said resource usage status calculation tool calculates said request handling resource usage amount for each layer of said plurality of servers.

14. The computer system according to claim 13, wherein said plurality of servers includes:
   at least one web server forming said web layer;
   an application server connected to said web server to form an application layer; and
   a database server connected to said application to form a data layer;
   wherein said system log generating tool generates said system log for each of said web layer, said application layer and said data layer, and
   wherein said resource usage status calculation tool calculates said request handling resource usage amount for each of said web layer, said application layer and said data layer.

15. The computer system according to claim 13, further comprising a system management data generating tool,
   wherein said system log describes a usage status of CPUs of said computer system for said each measurement period,
   wherein said resource usage status calculating tool calculates CPU times for said each measurement period and per web request, during which said CPUs are used in each of layers of said plurality of servers for handling said web requests, and
   wherein said system management data generating tool calculates a response time to said web requests for each type of said web requests through summing up said CPU times of the respective layers of said plurality of servers.

16. The computer system according to claim 12, further comprising:
   a load balancer receiving said web request from said clients and distributing said web requests to said web servers,
   wherein said load balancer generates a request log describing clock times when said web requests were handled and types of said web requests for each of said web requests received by said computer systems, and
   wherein said request classification log generating tool generates said request classification log from said request log.

17. The computer system according to claim 12, further comprising:

a billing data generating tool generating billing data indicative of a use fee to be charged to a user by using said request handling resource usage amount.

18. The computer system according to claim 17, wherein said resource usage status calculation tool calculates a default resource usage amount which is a usage amount of resources used independently of said web requests, and
   wherein said billing data generating tool calculates a virtual resource usage amount for each type of said web requests by distributing said default resource usage amount in accordance to the ratios of usage amounts of respective types of said web requests, and calculates said use fee from said request handling resource usage amount and said virtual resource usage amount.

19. The computer system according to claim 18, further comprising user data generating tool generating, from a request log which describes for each web request received by said computer system a user ID of a user who issues said each web request and a type of said each web request, user data describing a number of said web requests issued by said user for each type of said web requests,
   wherein said billing data generating tool calculates a unit price which is a fee charged to said web requests per web request from said virtual resource usage amount and calculates said use fee from said unit price and said user data.

20. The computer system according to claim 12, further comprising:
   a system management data generating tool calculating a usage status of said resources for each type of the web requests in said each measurement period from said request handling resource usage amount, and displaying the calculated usage status of said resources on a graph.

21. The computer system according to claim 20, wherein said system management data generating tool displays on said graph the usage status of said resources for each type of the web requests in said each measurement.

22. The computer system according to claim 20,
   wherein said system management data generating tool displays on said graph a usage rate of each of said resources in one or more measurement period for each type of said web requests.

23. A management apparatus for managing a computer system which handles web requests received from clients, comprising:
   a request classification log generating tool generating a request classification log which describes a number of web requests handled by said computer system in each of at least one measurement period for each of at least one type of said web requests;
   a system log generating tool generating a system log which describes a status of resources of said computer system in said each measurement period; and
   a resource usage status calculation tool, implemented by a hardware processor, for calculating a request handling resource usage amount per web request by using said request classification log and said system log for each type of said web requests, the request handling resource usage amount being a usage amount of resources used for handling said web requests,
   wherein said resource usage status calculation tool calculates said request handling resource usage amount through performing multiple linear regression analysis on a number of web requests of each type of said web requests in said each measurement period described in said request classification log and a usage status of resources of said computer system described in said system log for said each measurement period,
   wherein a web layer is formed by at least one web servers in said computer system,
   wherein said multiple linear regression analysis are performed for measurement periods "1" to "m", m being a measurement number of times,
   wherein a type of each of said web requests is any of web request types "R1" to "Rn", n being the number of types of said web requests,
   wherein a CPU time $U^W_{Rj}$ of the web request type "Rj" and $\Delta t \cdot \rho_z^w$ are calculated for i ranging from 1 to n in accordance with the following equation:

$$\begin{bmatrix} U^W_{R1} \\ U^W_{R2} \\ \vdots \\ U^W_{Rn} \\ \Delta t \cdot \rho^W_Z \end{bmatrix} = ({}^tX\ X)^{-1}{}^tX \begin{bmatrix} \Delta t \cdot \rho^W(1) \\ \Delta t \cdot \rho^W(2) \\ \vdots \\ \Delta t \cdot \rho^W(m) \end{bmatrix},$$

wherein $\Delta t$ is a length of each of said measurement periods, $\rho^w(i)$ is a CPU usage rate for entire said web layer for the measurement period "i", $\rho_z^w$ is a CPU usage rate for the entire said web layer in a situation in which no web request is handled, and ${}^tX$ is a transposed matrix of a matrix X represented by the following equation:

$$X = \begin{bmatrix} N_{R1}(1) & N_{R2}(1) & \ldots & N_{Rn}(1) & 1 \\ N_{R1}(2) & N_{R2}(2) & \ldots & N_{Rn}(2) & 1 \\ \vdots & \vdots & \ddots & \vdots & \vdots \\ N_{R1}(m) & N_{R2}(m) & \ldots & N_{Rn}(m) & 1 \end{bmatrix},$$

$N_{Rj}(i)$ being number of treated web requests of the web request type "Rj" in the measurement period "i",
   wherein a memory usage amount $M^W_{Rj}$ of the web request type "Rj" and a memory use amount $M^W_z$ in said web layer in the situation in which no web request is handled are calculated for i ranging from 1 to n by using the following equation:

$$\begin{bmatrix} M^W_{R1} \\ M^W_{R2} \\ \vdots \\ M^W_{Rn} \\ M^W_Z \end{bmatrix} = ({}^tX\ X)^{-1}{}^tX \begin{bmatrix} M^W(1) \\ M^W(2) \\ \vdots \\ M^W(m), \end{bmatrix},$$

where $M^W(i)$ is a memory usage amount for the entire said web layer for the measurement period "i", and
   wherein m is set to a value greater than the number n of the types of the web requests so that an inverse matrix of the matrix (${}^tX\ X$) exists.

24. The management apparatus according to claim 23, further comprising a plurality of layered servers,
   wherein said system log generating tool generates said system log for each layer of said plurality of servers; and
   wherein said resource usage status calculation tool calculates said request handling resource usage amount for each layer of said plurality of servers.

25. The management apparatus according to claim 23, further comprising:
  a billing data generating tool generating billing data indicative of a use fee to be charged to a user by using said request handling resource usage amount.
26. The management apparatus according to claim 25, wherein said resource usage status calculation tool calculates a default resource usage amount which is a usage amount of resources used independently of said web requests, and
  wherein said billing data generating tool calculates a virtual resource usage amount for each type of said web requests by distributing said default resource usage amount in accordance to the ratios of usage amounts of respective types of said web requests, and calculates said use fee from said request handling resource usage amount and said virtual resource usage amount.
27. A management method, implemented by a processor, for managing a computer system handling web requests received from clients, said method comprising:
  generating a request classification log which describes a number of web requests handled by said computer system in each of at least one measurement period for each of at least one type of said web requests;
  generating a system log which describes a status of resources of said computer system in said each measurement period; and
  calculating a request handling resource usage amount per web request by using said request classification log and said system log for each type of said web requests, the request handling resource usage amount being a usage amount of resources used for handling said web requests,
  wherein said request handling resource usage amount is calculated through performing multiple linear regression analysis on a number of web requests of each type of said web requests in said each measurement period described in said request classification log and a usage status of resources of said computer system described in said system log for said each measurement period,
  wherein a web layer is formed by at least one web servers in said computer system,
  wherein said multiple linear regression analysis are performed for measurement periods "1" to "m", m being a measurement number of times,
  wherein a type of each of said web requests is any of web request types "R1" to "Rn", n being the number of types of said web requests,
  wherein a CPU time $U^W_{Rj}$ of the web request type "Rj" and $\Delta t \cdot \rho_z^w$ are calculated for i ranging from 1 to n in accordance with the following equation:

$$\begin{bmatrix} U^W_{R1} \\ U^W_{R2} \\ \vdots \\ U^W_{Rn} \\ \Delta t \cdot \rho^W_Z \end{bmatrix} = ({}^tX\ X)^{-1}{}_tX \begin{bmatrix} \Delta t \cdot \rho^W(1) \\ \Delta t \cdot \rho^W(2) \\ \vdots \\ \Delta t \cdot \rho^W(m) \end{bmatrix},$$

where $\Delta t$ is a length of each of said measurement periods, $\rho^w(i)$ is a CPU usage rate for entire said web layer for the measurement period "i", $\rho_z^w$ is a CPU usage rate for the entire said web layer in a situation in which no web request is handled, and ${}^tX$ is a transposed matrix of a matrix X represented by the following equation:

$$X = \begin{bmatrix} N_{R1}(1) & N_{R2}(1) & \ldots & N_{Rn}(1) & 1 \\ N_{R1}(2) & N_{R2}(2) & \ldots & N_{Rn}(2) & 1 \\ \vdots & \vdots & \ddots & \vdots & \vdots \\ N_{R1}(m) & N_{R2}(m) & \ldots & N_{Rn}(m) & 1 \end{bmatrix},$$

$N_{Rj}(i)$ being a number of treated web requests of the web request type "Rj" in the measurement period "i",
  wherein a memory usage amount $M_{Rj}^W$ of the web request type "Rj" and a memory use amount $M_Z^W$ in said web layer in the situation in which no web request is handled are calculated for i ranging from 1 to n by using the following equation:

$$\begin{bmatrix} M^W_{R1} \\ M^W_{R2} \\ \vdots \\ M^W_{Rn} \\ M^W_Z \end{bmatrix} = ({}^tX\ X)^{-1}{}_tX \begin{bmatrix} M^W(1) \\ M^W(2) \\ \vdots \\ M^W(m) \end{bmatrix},$$

where $M^W(i)$ is a memory usage amount for the entire said web layer for the measurement period "i", and
  wherein m is set to a value greater than the number n of the types of the web requests so that an inverse matrix of the matrix $({}^tX\ X)$ exists.
28. A non-transitory recording medium recording a computer-readable program which when executed causes a computer to implement a method comprising:
  generating a request classification log which describes a number of web requests handled by said computer system in each of at least one measurement period for each of at least one type of said web requests;
  generating a system log which describes a status of resources of said computer system in said each measurement period; and
  calculating a request handling resource usage amount per web request by using said request classification log and said system log for each type of said web requests, the request handling resource usage amount being a usage amount of resources used for handling said respective web requests,
  wherein said request handling resource usage amount is calculated through performing multiple linear regression analysis on a number of web requests of each type of said web requests in said each measurement period described in said request classification log and a usage status of resources of said computer system described in said system log for said each measurement period,
  wherein a web layer is formed by at least one web servers in said computer system,
  wherein said multiple linear regression analysis are performed for measurement periods "1" to "m", m being a measurement number of times,
  wherein a type of each of said web requests is any of web request types "R1" to "Rn", n being the number of types of said web requests,
  wherein a CPU time $U^W_{Rj}$ of the web request type "Rj" and $\Delta t \cdot \rho_z^w$ are calculated for i ranging from 1 to n in accordance with the following equation:

$$\begin{bmatrix} U_{R1}^W \\ U_{R2}^W \\ \vdots \\ U_{Rn}^W \\ \Delta t \cdot \rho_Z^W \end{bmatrix} = ({}^t X\ X)^{-1_t} X \begin{bmatrix} \Delta t \cdot \rho^W(1) \\ \Delta t \cdot \rho^W(2) \\ \vdots \\ \Delta t \cdot \rho^W(m) \end{bmatrix},$$

where $\Delta t$ is a length of each of said measurement periods, $\rho^w(i)$ is a CPU usage rate for entire said web layer for the measurement period "i", $\rho_z^w$ is a CPU usage rate for the entire said web layer in situation in which no web request is handled, and ${}^t X$ is a transposed matrix of a matrix X represented by the following equation:

$$X = \begin{bmatrix} N_{R1}(1) & N_{R2}(1) & \ldots & N_{Rn}(1) & 1 \\ N_{R1}(2) & N_{R2}(2) & \ldots & N_{Rn}(2) & 1 \\ \vdots & \vdots & \ddots & \vdots & \vdots \\ N_{R1}(m) & N_{R2}(m) & \ldots & N_{Rn}(m) & 1 \end{bmatrix},$$

$N_{Rj}(i)$ being a number of treated web requests of the web request type "Rj" in the measurement period "i", wherein a memory usage amount $M_{Rj}^W$ of the web request type "Rj" and a memory use amount $M_Z^W$ in said web layer in the situation in which no web request is handled are calculated for i ranging from 1 to n by using the following equation:

$$\begin{bmatrix} M_{R1}^W \\ M_{R2}^W \\ \vdots \\ M_{Rn}^W \\ M_Z^W \end{bmatrix} = ({}^t X\ X)^{-1_t} X \begin{bmatrix} M^W(1) \\ M^W(2) \\ \vdots \\ M^W(m) \end{bmatrix},$$

wherein $M^W(i)$ is a memory usage amount for the entire said web layer for the measurement period "i", and wherein m is set to a value greater than the number n of the types of the web requests so that an inverse matrix of the matrix $({}^t X\ X)$ exists.

29. A management apparatus for managing a computer system which handles web requests received from clients, comprising:

a request classification log generating tool generating a request classification log which describes a number of web requests handled by said computer system in each of at least one measurement period for each of at least one type of said web requests;

a system log generating tool generating a system log which describes a number of web requests handled by said computer system in each measurement period for each type of said web requests;

a system log generating tool generating a system log which describes a status of resources of said computer system in said each measurement period; and a resource usage status calculation tool, implemented by a hardware processor, calculating a request handling resource usage amount per web request by using said request classification log and said system log for each type of said web requests, the request handling resource usage amount of resources used for handling said web requests, wherein said resource usage status calculation tool calculates said request handling resource usage amount through performing multiple linear regression analysis on a number of web requests of each type of said web requests in said each measurement period described in said request classification log and a usage status of resources of said computer system described in said system log for said each measurement period, wherein a web layer is formed by at least one web servers in said computer system, wherein said multiple linear regression analysis are performed for measurement periods "1" to "m", m being a measurement number of times, wherein a type of each of said web requests is any of web request types "R1" to "Rn", n being the number of types of said web requests, wherein a CPU time $U_{Rj}^W$ of the web request type "Rj" and $\rho_z^w$ are calculated for I ranging from 1 to n by using the following equation:

$$\begin{bmatrix} U_{R1}^W \\ U_{R2}^W \\ \vdots \\ U_{Rn}^W \\ \rho_Z^W \end{bmatrix} = ({}^t Y\ Y)^{-1_t} Y \begin{bmatrix} \Delta t(1) \cdot \rho^W(1) \\ \Delta t(2) \cdot \rho^W(2) \\ \vdots \\ \Delta t(m) \cdot \rho^W(m), \end{bmatrix},$$

where $\Delta t(i)$ is a length of the measurement period "i", $\rho^w(i)$ is a CPU usage rate for entire said web layer for the measurement period "i", $\rho_z^w$ is a CPU usage rate for the entire said web layer in a situation in which no web request is handled, and ${}^t Y$ is a transposed matrix of a matrix Y represented by the following equation:

$$Y = \begin{bmatrix} N_{R1}(1) & N_{R2}(1) & \ldots & N_{Rn}(1) & \Delta t(1) \\ N_{R1}(2) & N_{R2}(1) & \ldots & N_{Rn}(2) & \Delta t(2) \\ \vdots & \vdots & \ddots & \vdots & \vdots \\ N_{R1}(m) & N_{R2}(m) & \ldots & N_{Rn}(m) & \Delta t(m) \end{bmatrix},$$

$N_{Rj}(i)$ being a number of treated web requests of the web request type "Rj" in the measurement period "i", wherein a memory usage amount $M_{Rj}^W$ of the web request type "Rj" and a memory use amount $M_Z^W$ in said web layer in the situation in which no web request is handled are calculated for i ranging from 1 to n by using the following equations:

$$\begin{bmatrix} M_{R1}^W \\ M_{R2}^W \\ \vdots \\ M_{Rn}^W \\ M_Z^W \end{bmatrix} = ({}^t Y\ Y)^{-1_t} Y \begin{bmatrix} M^W(1) \\ M^W(2) \\ \vdots \\ M^W(m), \end{bmatrix},$$

where $M^W(i)$ is a memory usage amount for the entire said web layer for the measurement period "i", and wherein m is set to a value greater than the number n of the types of the web requests so that an inverse matrix of the matrix $({}^t Y\ Y)$ exists.

30. A management method, implemented by a processor, for managing a computer system handling web requests received from clients, said method comprising:

generating a request classification log which describes a number of web requests handled by said computer system in each of at least one measurement period for each of at least one type of said requests;

calculating a request handling resource usage amount per web request by using said request classification log and said system log for each type of said web requests, the request handling resource usage amount being a usage amount of resources used for handling said web requests, wherein said request handling resource usage amount is calculated through performing multiple linear regression analysis on a number of web requests of each type of said web requests in said each measurement period described in said request classification log and a usage status of resources of said computer system described in said system log for said each measurement period, wherein a web layer is formed by at least one web servers in said computer system, wherein said multiple linear regression analysis are performed for measurement periods "1" to "m", m being a measurement number of times, wherein a type of each said web requests is any of web request types "R1" to "Rn", n being the number of types of said web requests, wherein a CPU time $U^W_{Rj}$ of the web request type "Rj" and $\rho_z^w$ are calculated for i ranging from 1 to n by using the following equation:

$$\begin{bmatrix} U^W_{R1} \\ U^W_{R2} \\ \vdots \\ U^W_{Rn} \\ \rho^W_Z \end{bmatrix} = (^tY\ Y)^{-1\,t}Y \begin{bmatrix} \Delta t(1)\cdot \rho^W(1) \\ \Delta t(2)\cdot \rho^W(2) \\ \vdots \\ \Delta t(m)\cdot \rho^W(m) \end{bmatrix},$$

where $\Delta t(i)$ is a length of the measurement period "i", $\rho^w(i)$ is a CPU usage rate for entire said web layer for the measurement period "i", $\rho_z^w$ is a CPU usage rate for the entire said web layer in a situation in which no web request is handled, and $^tY$ is a transposed matrix of a matrix Y represented by the following equation:

$$Y = \begin{bmatrix} N_{R1}(1) & N_{R2}(1) & \cdots & N_{Rn}(1) & \Delta t(1) \\ N_{R1}(2) & N_{R2}(1) & \cdots & N_{Rn}(2) & \Delta t(2) \\ \vdots & \vdots & \ddots & \vdots & \vdots \\ N_{R1}(m) & N_{R2}(m) & \cdots & N_{Rn}(m) & \Delta t(m) \end{bmatrix},$$

$N_{Rj}(i)$ being a number of treated web requests of the web request type "Rj" in the measurement period "i", wherein a memory usage amount $M^W_{Rj}$ of the web request type "Rj" and a memory use amount $M^W_Z$ in said web layer in the situation in which no web request is handled are calculated for i ranging from 1 to n by using the following equation:

$$\begin{bmatrix} M^W_{R1} \\ M^W_{R2} \\ \vdots \\ M^W_{Rn} \\ M^W_Z \end{bmatrix} = (^tY\ Y)^{-1\,t}Y \begin{bmatrix} M^W(1) \\ M^W(2) \\ \vdots \\ M^W(m) \end{bmatrix},$$

where $M^W(i)$ is a memory usage amount for the entire said web layer for the measurement period "i", and wherein m is set to a value greater than the number n of the types of the web requests so that an inverse matrix of the matrix $(^tY\ Y)$ exists.

31. A non-transitory recording medium recording a computer-readable program which when executed causes a computer to implement a method comprising:

generating a request classification log which describes a number of web requests handled by said computer system in each of at least one measurement period for each of at least one type of said web requests;

generating a system log which describes a status of resources of said computer system in said each measurement period; and calculating a request handling resource usage amount per web request by using said request classification log and said system log for each type of said web requests, the request handling resource usage amount being usage amount of resources used for handling said respective web requests;

wherein said request handling resource usage amount is calculated through performing multiple linear regression analysis on a number of web requests of each type of said web requests in said each measurement period described in said request classification log and a usage status of resources of said computer system described in said system log for said each measurement period, wherein a web layer is formed by at least one web servers in said computer system, wherein said multiple linear regression analysis are performed for measurement periods "1" to "m", m being a measurement number of times, wherein a type of each of said web requests is any of web request types "R1" to "Rn", n being the number of types of said web requests, wherein a CPU time $U^W_{Rj}$ of the web request type "Rj" and $\rho_z^w$ are calculated for i ranging from 1 to n by using the following equation:

$$\begin{bmatrix} U^W_{R1} \\ U^W_{R2} \\ \vdots \\ U^W_{Rn} \\ \rho^W_Z \end{bmatrix} = (^tY\ Y)^{-1\,t}Y \begin{bmatrix} \Delta t(1)\cdot \rho^W(1) \\ \Delta t(2)\cdot \rho^W(2) \\ \vdots \\ \Delta t(m)\cdot \rho^W(m) \end{bmatrix},$$

where $\Delta t(i)$ is a length of the measurement period "i", $\rho^w(i)$ is a CPU usage rate for entire said web layer for the measurement period "i", $\rho_z^w$ is a CPU usage rate for the entire said web layer in a situation in which no web request is handled, and $^tY$ is a transposed matrix of a matrix Y represented by the following equation:

$$Y = \begin{bmatrix} N_{R1}(1) & N_{R2}(1) & \cdots & N_{Rn}(1) & \Delta t(1) \\ N_{R1}(2) & N_{R2}(1) & \cdots & N_{Rn}(2) & \Delta t(2) \\ \vdots & \vdots & \ddots & \vdots & \vdots \\ N_{R1}(m) & N_{R2}(m) & \cdots & N_{Rn}(m) & \Delta t(m) \end{bmatrix},$$

$N_{Rj}(i)$ being a number of treated web requests of the web request type "Rj" in the measurement period "i", wherein a memory usage amount $M^W_{Rj}$ of the web request type "Rj" and a memory use amount $M^W_Z$ in said web layer in the situation in which no web request is handled are calculated for i ranging from 1 to n by using the following equation:

$$\begin{bmatrix} M_{R1}^W \\ M_{R2}^W \\ \vdots \\ M_{Rn}^W \\ M_Z^W \end{bmatrix} = ({}^tY\ Y)^{-1}{}^tY \begin{bmatrix} M^W(1) \\ M^W(2) \\ \vdots \\ M^W(m), \end{bmatrix},$$

where $M^W(i)$ is a memory usage amount for the entire said web layer for the measurement period "i", and wherein m is set to a value greater than the number n of the types of the web requests so that an inverse matrix of the matrix $({}^tY\ Y)$ exists.

\* \* \* \* \*

UNITED STATES PATENT AND TRADEMARK OFFICE
CERTIFICATE OF CORRECTION

PATENT NO. : 8,171,133 B2
APPLICATION NO. : 12/373254
DATED : May 1, 2012
INVENTOR(S) : Tanaka It is certified that error appears in the above-identified patent and that said Letters Patent is hereby corrected as shown below:

In the Specifications

Column 10, Line 9: delete "$\Delta t \cdot \rho^{W}$" and insert -- $\Delta t \cdot \rho_z^{W}$ --

Column 16, Line 12: delete "
$$\Psi_{Rj}^{W}(i) = N_{Rj}(i) \cdot U_{Rj}^{W}/\Delta t,$$
$$\Psi_{Rj}^{F}(i) = N_{Rj}(i) \cdot U_{Rj}^{F}/\Delta t, \text{ and}$$
$$\Psi_{Rj}^{D}(i) = N_{Rj}(i) \cdot U_{Rj}^{D}/\Delta t,$$
"

and insert --
$$\Psi_{Rj}^{W}(i) = N_{Rj}(i) \cdot U_{Rj}^{W}/\Delta t(i),$$
$$\Psi_{Rj}^{F}(i) = N_{Rj}(i) \cdot U_{Rj}^{F}/\Delta t(i), \text{ and}$$
$$\Psi_{Rj}^{D}(i) = N_{Rj}(i) \cdot U_{Rj}^{D}/\Delta t(i),$$
--

Signed and Sealed this
Eighteenth Day of March, 2014

Michelle K. Lee
*Deputy Director of the United States Patent and Trademark Office*

CERTIFICATE OF CORRECTION (continued)

U.S. Pat. No. 8,171,133 B2

Page 2 of 2

In the Claims

Column 24, Line 48-54, Claim 23, delete "$\begin{bmatrix} M_{R1}^W \\ M_{R2}^W \\ \vdots \\ M_{Rn}^W \\ M_Z^W \end{bmatrix} = (^tX \ X)^{-1\,t}X \begin{bmatrix} M^W(1) \\ M^W(2) \\ \vdots \\ M^W(m), \end{bmatrix},$"

and insert -- $\begin{bmatrix} M_{R1}^W \\ M_{R2}^W \\ \vdots \\ M_{Rn}^W \\ M_Z^W \end{bmatrix} = (^tX \ X)^{-1\,t}X \begin{bmatrix} M^W(1) \\ M^W(2) \\ \vdots \\ M^W(m) \end{bmatrix},$ --